United States Patent [19]

Lopatik

[11] Patent Number: 5,709,626

[45] Date of Patent: Jan. 20, 1998

[54] METHOD OF TRANSMITTING MOTION AND DEVICE FOR EFFECTING THE SAME

[76] Inventor: Boris Borisovich Lopatik, kv.237, korp.1126, Zelenograd, Moscow, 103460, Russian Federation

[21] Appl. No.: 598,358

[22] Filed: Feb. 8, 1996

[30] Foreign Application Priority Data

Aug. 11, 1995 [RU] Russian Federation .......... 95113627

[51] Int. Cl.$^6$ ................................................. F16H 15/48
[52] U.S. Cl. ......................... 475/14; 475/183; 475/185; 475/187; 475/191; 475/193; 475/257; 74/57
[58] Field of Search ........................ 475/14, 183, 185, 475/187, 190, 191, 193, 194, 257, 306, 904; 74/57, 117, 118, 119

[56] References Cited

U.S. PATENT DOCUMENTS

| | | | |
|---|---|---|---|
| 1,629,902 | 5/1927 | Arter et al. | 475/185 |
| 4,834,033 | 5/1989 | Larsen | 74/57 |
| 4,850,248 | 7/1989 | Korban et al. | 475/14 |
| 5,122,099 | 6/1992 | Boedo et al. | 475/185 |

OTHER PUBLICATIONS

"Theory of Mechanisms and Machines" by S.N. Kozhevnikov, 1969, pp. 50 and 304.

Primary Examiner—Charles A. Marmor
Assistant Examiner—Sherry Lynn Estremsky
Attorney, Agent, or Firm—Hardaway Law Firm PA

[57] ABSTRACT

Motion is transmitted by means of a kinematic chain, comprising four members—a driving, driven, intermediate and support members. The driving, driven and supporting members rotate about a common axis. The intermediate member, by virtue of its operative linkages with the driving, driven and supporting members, rotates about the common axis and translates either parallel or, according to another version, perpendicular to the common axis. The supporting member is stopped during motion transmission. The intermediate member moves with respect to the driving, driven and supporting members during motion transmission. The directions of these motions define angles with the direction of motion of the driving member in the plane parallel or perpendicular, respectively, to the common axis. Changing the at least one of the angles can change the ratio of the speeds of the driving and driven member.

13 Claims, 6 Drawing Sheets

METHOD OF TRANSMITTING MOTION AND DEVICE FOR EFFECTING THE SAME

FIELD OF THE INVENTION

The present invention relates to the field of mechanical engineering and more particularly to methods of transmitting motion and to devices for effecting the methods of transmitting motion, viz. to mechanical transmissions. The present invention may be used most advantageously in transport vehicles, for example, in automobiles and trucks, as well as in load-lifting facilities, for example, in cranes, and also in the machine-tool industry, for example, in a drive of a machine tool and so forth.

Background of the Invention

The ever-growing use of transport vehicles, especially automobiles, makes the problem of increasing the fuel economy and improving the environmental safety of vehicles most urgent particularly in the urban traffic characterized by high concentration, irregular movement and frequent stops of transport vehicles.

Under such conditions the increase in fuel economy and consequently the improvement of environmental safety of an automobile can be insured by introducing into the power train thereof an unlimited infinitely variable transmission. In such a transmission the gear ratio, i.e. the ratio of rotational speed of a driving member to rotational speed of a driven member is varied as necessary in the process of operation without any steps throughout the entire range of ratios of an engine crankshaft rotational speed to rotational speed of a transport vehicle wheel. The use of such a transmission in the power train of a transport vehicle increases the fuel economy not only at the expense of providing an optimum operating mode for the engine irrespective of the vehicular movement but also provides the conditions for accumulation and subsequent use of the braking energy of a transport vehicle. Besides the use of an infinitely variable transmission substantially improves the performance qualities of an automobile, for example, dynamic characteristics and simplifies control of transport vehicles.

Known in the prior art are a method of transmitting motion with a stepless (infinitely variable) control of the gear ratio and mechanical transmissions based on this method and called V-belt variators, for example, a well known transmission "Transmatic" which however fails to provide a complete solution of the problem of a controlled transmission of motion, as it permits the transmission of motion only in a limited range of gear ratios. Therefore, the urgent problem resides in providing a method of transmitting motion with stepless variation of the gear ratio in an unlimited range of values thereof in the process of a transport vehicle movement and along with the provision of a high efficiency.

The closest prior art of the invention as to the concept thereof, availability of main members and the presence of kinematic links therebetween is a method of transmitting motion used in a well known and widely employed in a power train of transport vehicles a planetary transmission which is essentially a differential mechanism comprising four movable members, one of which, viz. an intermediate member or a planet pinion, is in operative engagement with each of the three other members, one of which is stopped (fixed or held motionless).

Confer, for example, "Theory of Mechanisms and Machines" by Kozhevnikov S. N., Moscow, Publishing House "Mashinostroyenie", 1969, p.50, FIG. 1.15 and p.304, FIG. 12.10.

A method of transmitting motion used in a planetary transmission resides in that the motion of a driving member (for example, a sun gear) is converted into the motion of a driven member (a planet pinion carrier) by means of an intermediate member (a planet pinion) cooperating with a supporting member (an epicyclic gear) each being installed for rotary motion about a common axis (the axis of the planetary transmission) and the intermediate member is installed for an additional motion, and thereafter the supporting member is stopped.

In this case conversion of motions of the members resides in that the motion of the driving member, acted upon by the moment of external motive forces, relatively to the driven member, acted upon by the moment of external forces of effective resistance, is converted into a relative motion of the intermediate and supporting members. As a result, the intermediate member executes an additional motion which is essentially rotation of the intermediate member about the axis parallel to a commmon axis or intersecting therewith, the supporting member is rotating relatively to the common axis and the driven member is motionless, as it is acted upon by the moment of external forces of effective resistance, and the supporting member is free.

For transmitting motion from the driving member to the driven member by said method the supporting member is stopped, whereby the relative motion of the intermediate member and the supporting member is converted into the motion of the supporting member comprising two motions. One of these motions is main and is essentially a rotary motion of the intermediate member relatively to the common axis, and the other of these motions is additional and is essentially a rotary motion of the intermediate member relatively to the axis associated with the driven member and disposed parallel to the common axis or intersecting therewith. The main of said motions of the intermediate member is transmitted to the driven member at a definite ratio.

When motion is transmitted by said method the value of the gear ratio, i.e. the ratio of the driving member motion speed to the driven member motion speed has a preset constant value. This is stipulated by the fact that the ratio of values of the main and the additional motions, comprising the motion of the intermediate member, each being proportional to the value of the driving and driven members, has a constant value, as it is determined by the ratio of dimensions of the members having the constant value in the process of transmitting motion.

SUMMARY OF THE INVENTION

It is an object of the invention to provide a method of transmitting motion from a driving member to a driven member through the medium of an intermediate member insuring a stepless variation of the gear ratio in an unlimited range of values thereof.

It is another object of the invention to provide a device for effecting the transmission of motion by said method insuring the stepless variation of the gear ratio in an unlimited range of possible values thereof, for example, from minus ∞ to minus 10 and from plus 2 to plus ∞.

These and other objects of the invention are attained by that in accordance with the proposed method, according to the invention, the shape of mating surfaces of said members is made so that an additional motion of the intermediate member is essentially a translational motion the vector, or direction of which is parallel with or perpendicular to a common axis, the vectors of linear speeds of the intermediate member relatively to the driving and driven members intersect in a plane parallel to the vectors of tangential and translational components of the intermediate member motion and change in said plane the magnitude of at least one of angles formed by each of the vectors of linear speed of the intermediate member relatively to the driving, driven and supporting members with the vector of linear speed of the driving member, the number of supporting members being equal to the number of the intermediate members, then the supporting member is stopped in accordance with phases of motion of the intermediate member cooperating therewith, the phases of motions of the intermediate members being different.

Such a method of transmitting motion provides the conversion of motion of the driving member into the motion of the driven member with a stepless variation of the gear ratio in an unlimited range of values thereof. This is stipulated by the following.

Conversion of motions of the members by said method resides in that the motion of the driving member, acted upon by the moment of external motive forces, relatively to the driven member, acted upon by the moment of external forces of useful resistance, is converted into a relative motion of the intermediate and supporting members. Then the supporting member is stopped, whereby the relative motion of the intermediate and supporting members is converted into the motion of the intermediate member generally comprising two motions, main and additional. The main motion of the intermediate member is essentially a rotary motion thereof about the common axis and an additional motion is essentially a translational motion of the intermediate member the direction of which is parallel with or perpendicular to the common axis. Due to this, the vectors of motions or the vectors of linear speeds of the intermediate member relatively to the driving, driven and supporting members form angles with a vector of linear speed of the driving member in a plane parallel to the vectors of tangential and translational components of the intermediate member motion. Therefore, each of the motions of the intermediate member relatively to the driving, driven and supporting members has two (a pair) mutually perpendicular components, tangential and axial or tangential and radial, relatively to said axis. In this case, it is essential that one of the components of each said pair thereof, viz. the tangential one has the direction parallel to the direction in which the driving and driven members are rotating, and the other from the components of each said pair, viz. the axial or radial, i.e. the translational one has the direction in which the driving and driven members are motionless.

Said components of relative motions of the intermediate member possess a plurality of qualities.

Firstly, values of the tangential and translational (axial or radial) components of each of motions of the intermediate member relatively to the driving, driven and supporting members are proportional to a value of the relative motion of the driving and driven members.

Secondly, the ratio of the tangential and translational components of each of the motions of the intermediate member relatively to the driving, driven and supporting members is defined by magnitudes of the angles formed by vectors of linear speeds of the intermediate member relative respectively to the driving, driven and supporting members with the vector of a linear speed of the driving member in a respective plane from the planes described hereinbefore, and are not dependent on the value of the relative motion of the driving and driven members.

Thirdly, the translational (axial or radial) components of motions of the intermediate member relatively to the driving, driven and supporting members are equal to one another in magnitude, irrespective of the magnitude of the angles formed by the vectors of linear speeds of the intermediate member relative respectively to the driving, driven and supporting members with the vector of a linear speed of the driving member in a respective plane of said planes and irrespective of the value of the relative motion of the driving and driven members. This is stipulated by a relative immovability of the driving, driven and supporting members both in the axial and radial directions relatively to the common axis of rotation of said members.

Said properties of relative motions of the intermediate member stipulate such values of the tangential components of motions of the driving, driven and supporting members relatively to the intermediate member at which there is attained an equality of the translational components of relative motions of said members. At the same time, the definiteness of magnitudes of tangential components of motions of the intermediate member relatively to the driving, driven and supporting members and consequently the definiteness of the ratio of the rotational speed of the driving member to the rotational speed of the driven member is obtained upon fulfillment of two conditions.

One of these conditions resides in that it is required to provide the definiteness of magnitudes of the angles formed by vectors of linear speeds of the intermediate member relatively to the driving, driven and supporting members with the vector of linear speed of the driving member, or in other words, the definiteness of ratios of the tangential and translational components of each of said relative motions of the intermediate member.

The other of these conditions resides in that for obtaining the definiteness of the driven member motion, it is necessary to have the definiteness of motions of the supporting and driving members. As the motion of the driving member is always defined by definition, it is sufficient to stop the supporting member and the state of motion thereof, as well as the state of motion of the driven member will be definite.

Said properties of the components of motions of the intermediate member and their said manifestations stipulate the dependence of the ratio of magnitudes of angular speeds of the driving and driven members on the values of ratios of components of the motions of the intermediate member relatively to the driving member, the driven member and the motionless supporting member, and consequently on the magnitudes of the angles formed by the vectors of linear speeds of the intermediate member relatively to the driving, driven and supporting members with the vector of linear speed of the driving member. Therefore, changing the magnitude of at least one of said angles changes the ratio of motion speeds of the driving and driven members, i.e. changes the gear ratio when the motion is transmitted by the proposed method.

Said dependence of the gear ratio on magnitudes of the angles formed by the vectors of linear speeds of the intermediate member relatively to the driving, driven and supporting members with the vector of linear speed of the driving member takes place on condition that the vectors of motions of the intermediate member relatively to the driving and driven members intersect in a plane parallel to the vectors of tangential and translational components of motion of the intermediate member. Otherwise, i.e. in the case when the vectors of motions of the intermediate member relatively to the driving and driven members do not intersect in said plane, i.e. remain parallel the gear ratio irrespective of magnitudes of said angles remains constant depending on the ratio of effective geometric parameters of points of contact of mating surfaces of the members, i.e. on the ratio of the radius vectors of said points relatively to the common axis.

When motion is transmitted by the proposed method the range of variation or regulation of the gear ratio is unlimited, as with variation of magnitudes of the angles mentioned hereinbefore and on reaching the equality of magnitudes of the angles formed by the vector of linear speed of the driving member and the vectors of linear speeds of the intermediate member relatively to the supporting and driven members the gear ratio is equal to infinity (i.e. the value of the driven member speed is equal to zero at any value of the driving member speed), and on reaching the equality of magnitudes of the angles formed by the vector of linear speed of the driving member and the vectors of linear speeds of the intermediate member relatively to the supporting and driving members the value of the gear ratio tends to zero (i.e. the value of the driven member speed tends to infinitely large value at any value of the driving member speed, except zero), but it cannot become equal to zero because of a self-braking effect. In this situation a concrete attainable value of the gear ratio depends on the construction of kinematic pairs used in the device for transmitting motion by the proposed method.

When changing the magnitude of the angle formed by the vector of linear speed of the intermediate member relatively to the supporting member with the vector of linear speed of the driving member in a range of from the magnitude of the angle formed by the vector of linear speed of the intermediate member relatively to the driving member with the vector of linear speed of the driving member to a magnitude of the angle formed by the vector of linear speed of the intermediate member relatively to the driven member with the vector of linear speed of the driving member the value of the gear ratio will change within the limits mentioned hereinbefore, i.e. from about zero to infinity.

If with variation of the magnitude of the angle formed by the vector of linear speed of the intermediate member relatively to the supporting member with the vector of linear speed of the driving member the value of said magnitude gets beyond the limits of said range, then the sign of the gear ratio will be changed into the opposite, i.e. the motion transmitted by the proposed method will be reversed.

Magnitudes of the angles formed by vectors of motions of the intermediate member relatively to the driving, driven and supporting members with the vector of linear speed of the driving member may be varied without jumps or steps, therefore the gear ratio according to the proposed method of transmitting motion may be varied without jumps or steps, i.e. in an infinitely variable manner.

When transmitting motion by the proposed method the functions of the driving and driven members may be changed so that the driven member may function as a driving one, and the driving member may function as a driven one, i.e. a device for transmitting motion by the proposed method is essentially a reversible one.

Motion of the intermediate member with two components, one of which is translational and has in the real conditions a finite extension and a finite duration, therefore the transmission of motion by means of the intermediate member the motion of which has rotational and translational components is essentially a single act of the finite duration (duration in time) even with an unlimited duration of stopping the supporting member or holding it motionless and with any number of the intermediate members. Therefore, for a continuous transmission of motion of any duration by the proposed method, it is required that the number of the supporting members should correspond to the number of the intermediate members, the supporting member should be stopped in compliance with the phases of motion of the intermediate member cooperating therewith and the phases of motions of the intermediate members should be different. In this case the transmission of motion from the driving member to the driven member by means of each intermediate member becomes periodic, and as the phases of motion are shifted in time relatively to one another, then separate periodic acts of a regulated transmission of motion from the driving member to the driven member become sequential and form a continuous process of the regulated transmission of motion of any duration.

In order to eliminate variations in value of the gear ratio and thus to reduce the consumption of energy for controlling the process of transmitting motion and to simplify the construction of a device for transmitting motion by the proposed method the supporting member should be held in a motionless state in the course of a period within the limits of from about ¼ (1−μ) to about ¼ (1+μ) part of each period of motion of the intermediate member cooperating with said supporting member, the ratio of magnitudes of the translational and tangential components of the intermediate member relatively to the driving and driven members have constant values in the course of a period within the limits of from about ½ (1−μ) to ½ (1+μ) part of each half-period of motion of the intermediate member, and there is varied the magnitude of the angle formed by the vector of linear speed of the intermediate member relatively to the supporting member cooperating therewith, and with the vector of linear speed of the driving member, where:

μ is the ratio of the value of a period during which the supporting member is held motionless to the value of a half-period of motion of the intermediate member.

Such features of the method of transmitting motion provide synchronization of the supporting member with phases of motion of the intermediate member during which the ratio of the rotational and translational components of motions of the intermediate member relatively to the driving and driven members have constant values which permits elimination of the need for compensating variations in value of the gear ratio in each cycle of transmitting motion and provides for a simple design embodiment of a means for varying the magnitude of one of the angles formed by directions of relative motions of the intermediate member and by the vector of linear speed of the driving member, viz. the vector of linear speed of the intermediate member relatively to the supporting member, in a device for effecting the proposed method of transmitting motion.

For reducing the number of necessary kinematic connections in a device for a continuous transmission of a regulated motion, it is required that the angle formed by the vector of linear speed of the intermediate member relatively to the driven member and the vector of linear speed of the driving member in a plane parallel to the vectors of the tangential and translational components of the intermediate member be equal to the right angle. In other words, it is required that the vector of linear speed of the intermediate member relatively to the driven member be parallel to the vector of the translational component of motion of the intermediate member. Such a condition provides increase in the efficiency of a device for effecting the method of transmitting motion due to decrease in the number of required kinematic connections in this device.

As to the creation of a device for carrying out the method of transmitting motion, the solution of the task to be sought have a plurality of alternative embodiments.

A first alternative embodiment of the device for carrying out the method of transmitting motion comprises a housing contained wherein are driving, driven and supporting members adapted for coaxial rotation, a supporting member stopping means adapted for moving in the direction perpendicular to the vector of peripheral speed of the supporting member, and an intermediate member being in operative engagement with the driving, driven and supporting members, according to the invention the operative engagement of the intermediate member with the driving member incorporates a cylindrical grooved cam which is associated with one of said members and its axis is coaxial with the axis of rotation of the driving member, and each peripheral surface of said cam is essentially a face circular wavy surface with which is in contact a body of revolution forming in conjunction with the other one of said members a rotational kinematic pair the axis of which is perpendicular to the axis of rotation of the driving member, the operative engagement of the intermediate member with the driven member incorporates a rectilinear kinematic pair formed by said members, the direction of a relative motion of members of said rectilinear kinematic pair being parallel to the axis of rotation of the driven member, provision is made of a means for regulating the ratio of rotational speed of the driving member to rotational speed of the driven member forming in conjunction with the housing a rotational kinematic pair, the operative engagement of the intermediate member With the supporting member incorporates a link installed through the medium of a fork in the supporting member for rotation relatively to two mutually perpendicular axes one of which is perpendicular to the axis of rotation of the supporting member and is coincident with the axis of rotation of the fork in the supporting member, and the other one is coincident with a longitudinal axis of symmetry of a slot of the link the slide block of which is essentially a body of revolution forming in conjunction with the intermediate member a rotational kinematic pair the axis of which is perpendicular to the axis of rotation of the supporting member, and a means designed for rotating the fork relatively to the supporting member is in operative engagement with the regulating means and with the supporting member, the supporting member stopping means being in operative engagement with the driving and driven members.

Such a design embodiment of the device for transmitting motion provides for a periodic conversion of the driving member motion into the driven member motion along with a stepless variation of the gear ratio in an unlimited range of values thereof. This is stipulated by that the set of members, their location and possible motions defined by the presence of the operative engagement of the members, the shape in which the mating surfaces thereof have been embodied and availability of a means for acting on said mating surfaces are fully suited to the requirements for carrying out the method of controlled transmission of motion by using in the kinematic chain of the device one supporting member and one intermediate member the translational component of motion of the latter is parallel to the common axis, i.e. to the axis of rotation of the driving, driven, intermediate and supporting members.

It is desirable that the device be additionally provided with at least two supporting members, each be installed for rotation relatively to the axis of rotation of the driving and driven members and be provided with a stopping means installed in the housing for rotation in the direction perpendicular to the vector of peripheral speed of the supporting member which is in opertive engagement with the driving and driven members, and be additionally provided with at least two intermediate members the number of which corresponds to the number of the supporting members and each being in operative engagement with the driving and driven members and with the supporting members cooperating therewith similarly to the operative engagement of a first intermediate member with the driving and driven members, and with the supporting members cooperating therewith, and the supporting members should be uniformly spaced along the circumference relatively to the axis of rotation of the driving and drive members, the number of waves of the face circular wavy surface of the cam groove being equal to:

$$K = m \cdot n + 1$$

where:

K is the number of waves on the face circular surface of the cam:

m is the number of the intermediate members equal to value $2/\mu$, rounded off to the nearest large integer;

n is a natural number or zero.

Such a design embodiment of the device for a controlled transmission of motion provides the constancy in conversion of motion of the driving member into motion of the driven member.

It is likewise desirable that a profile of each wave on the development of the section of the face circular wavy surface of the grooved cam made by the circular cylindrical surface concentric with the axis of rotation of the driving member should represent an equidistant curve on the development of the trajectory of a point of intersection of said cylindrical surface with the axis of a body of revolution being in contact with said wavy surface, and each wave on the development of said trajectory should be symmetric about the element of said cylindrical surface passing through the peak of the wave on the trajectory development, and each half-wave on the trajectory development should have a rectilinear section the projections of finite points of the rectilinear section onto the height of the wave are at a height amounting respectively to about $\frac{1}{2}(1-\mu)$ and to about $\frac{1}{2}(1+\mu)$ part of the wave height.

Such a profile of the wave of the face circular wavy surface of the cam groove provides the constancy of the ratio of the tangential and translational components of the intermediate member motion relatively to the driving member in the course of stopping the supporting member. Said constancy of the ratio of values of the components of the intermediate member is one of the conditions insuring the absence of variations of the gear ratio at the period of transmitting motion from the driving member to the driven member through the intermediate member.

It is preferable that a means for rotating a fork relatively to the supporting member be provided with a connecting rod forming together with the fork a spherical joint the center of which is offset relatively to the axis of rotation of the fork in the supporting member, and forming a spherical joint with a first ring-shaped member forming together with the supporting member a rectilinear kinematic pair the direction of relative motion of the members thereof is parallel to the axis of rotation of the supporting member, and forming together with a second ring-shaped member a rotational kinematic pair the axis of rotation thereof is coaxial with the axis of rotation of the supporting member and perpendicular to the plane of the first ring-shaped member, and the second ring-shaped member forms together with the housing a rectilinear kinematic pair the direction of relative motion of the members thereof is parallel to the axis of rotation of the supporting member and perpendicular to the plane of the second ring-shaped member, and forming together with a regulating means a kinematic pair with a helical relative motion of the members the axis of which is coaxial with the axis of rotation of the regulating means and parallel to the axis of rotation of the supporting member.

Such a design embodiment of the means for rotating the fork makes it possible to vary the magnitude of an angle formed by the vector of linear speed of the intermediate member relatively to the supporting member and by the vector of linear speed of the driving member and thus to vary the gear ratio in the device through the medium of the regulating means irrespective of the state of motion and angular position of the supporting member in the device housing.

It is also preferable that the operative engagement of the stopping means with the driving and driven members be provided with a roller forming together with the stopping means, spring-loaded in the housing, a rotational kinematic pair the axis of rotation of which is parallel to the axis of rotation of the supporting member and being in contact with a cam the axis of rotation of which is coaxial with the axis of rotation of the supporting member connected with a carrier of a bevel gear forming a rotational kinematic pair with the driving member coaxial with the axis of rotation of the driving member, and forming a rotational kinematic pair with a bevel gear the axis of rotation of which is perpendicular to the axis of rotation of the driving and driven members being in meshing with two bevel gears one of which is installed on the driving member coaxially with the latter, and the other one forms together with the housing a rotational kinematic pair the axis of which is coaxial with the axis of rotation of the driving member and through the medium of a gearing having a gear ratio equal to minus one is connected with the driven member.

Such a design embodiment of the operative engagement of the stopping means with the driving and driven members insures the stopping of the supporting member in synchronism with phases of the intermediate member motion in the device comprising one intermediate member and one supporting member.

It is advantageous that the operative engagement of each stopping means with the driving and driven members be provided with a roller forming together with the stopping means, spring-loaded in the housing, a rotational kinematic pair the axis of rotation of which is parallel to the axis of rotation of the supporting member and being in contact with one of cams the axis of rotation of each being coaxial with the axis of rotation of the supporting member, and each of the cams is connected with a carrier of a bevel gear forming together with the driving member a rotational kinematic pair coaxial with the axis of rotation of the driving member and forming together with a bevel gear a rotational kinematic pair the axis of rotation of which is perpendicular to the axis of rotation of the driving and driven members being in meshing with two bevel gears, one of which is connected with the driving member and located coaxially with the latter and the other one forms together with the housing a rotational kinematic pair the axis of which is coaxial with the axis of rotation of the driving member and through the medium of a gearing, having the gear ratio equal to minus one, is connected with the driven member.

Such a design embodiment of the operative engagement of each of the stopping means with the driving and driven members insures the stopping of each of the supporting members in synchronism with phases of motion of the intermediate member cooperating with each of the supporting members in the device comprising a plurality of intermediate members and an appropriate number of the supporting members for providing a continuous transmission of motion.

A second alternative embodiment of a device for effecting the method of transmitting motion comprises a housing contained wherein are driving, driven and supporting members adapted for coaxial rotation, a supporting member stopping means adapted for moving in the direction perpendicular to the vector of peripheral speed of the supporting member, and an intermediate member being in operative engagement with the driving, driven and supporting members, according to the invention the operative engagement of the intermediate member with the driving member incorporates a face grooved cam associated with one of said members and its plane is perpendicular to the axis of rotation of the driving member, and each working surface of the cam groove is essentially a closed wavy surface with which is in contact a body of revolution forming in conjunction with the other one from said members a rotational kinematic pair the axis of which is parallel to the axis of rotation of the driving member, the operative engagement of the intermediate member with the driven member incorporates a rectilinear kinematic pair formed by said members, the direction of a relative motion of members of said rectilinear kinematic pair is perpendicular to the axis of rotation of the driven member, provision is made of a means for regulating the ratio of rotational speed of the driving member to rotational speed of the driven member forming together with the housing a rotational kinematic pair, the operative engagement of the intermediate member with the supporting member incorporates a link forming together with the intermediate member a rotational kinematic pair the axis of which is parallel to the axis of rotation of the supporting member and perpendicular to the longitudinal axis of symmetry of a slot of the link the slide block of which is essentially a body of revolution forming together with the supporting member a rotational kinematic pair the axis of which is parallel to the axis of rotation of the supporting member, and a means provided for rotating the link relatively to the intermediate member is in operative engagement with the regulating means and the intermediate member, the supporting member regulating means being in operative engagement with the driving and driven members.

Such a design embodiment of the device for transmitting motion provides for a periodic conversion of the driving member motion into the driven member motion with a stepless variation of the gear ratio in an unlimited range of values thereof. This is stipulated by that the set of members, their location and possible motions defined by the presence of the operative engagement of the members, the shape in which the mating surfaces thereof have been embodied and availability of a means for acting on said mating surfaces are well suited to the requirements for carrying out the method of controlled transmission of motion by using in the kinematic chain of the device one intermediate member and one supporting member, the translational component of motion of the intermediate member is perpendicular to the common axis, i.e. to the axis of rotation of the driving, driven, intermediate and supporting members.

It is desirable that the device be additionally provided with at least two supporting members, each being installed for rotation relatively to the axis of rotation of the driving and driven members and be provided with a stopping means to be installed in the housing for moving in the direction perpendicular to the vector of linear speed of the supporting member and to be in operative engagement with the driving and driven members, and be additionally provided with at least two intermediate members the number of which corresponds to the number of the supporting members, each being in operative engagement with the driving and driven members and with the supporting members cooperating therewith similarly to the operative engagement of the first intermediate member with the driving and driven members, and with the supporting members cooperating therewith, and the supporting members should be uniformly spaced along the circumference relatively to the axis of rotation of the driving and drive members, the number of waves on the closed wavy surface (of the grooved cam) being equal to:

$$K = m \cdot n + 1$$

where:

K is the number of waves on the wavy surface of the cam groove;

m is the number of the intermediate members equal to value $2/\mu$, rounded off to the nearest large integer;

n is a natural number or zero.

Such a design embodiment of the device for a controlled transmission of motion provides the constancy of converting the motion of the driving member into the motion of the driven member.

It is likewise desirable that a profile of the section of the closed wavy surface of a face grooved cam the plane of which is perpendicular to the axis of rotation of the driving member should represent an equidistant curve of the trajectory of a point of intersection of said plane with the axis of the body of revolution being in contact with the wavy surface presenting essentially a closed wavy curve each wave of which is symmetric about a straight line belonging to said plane and passing through the peak of the wave and the axis of rotation of the driving member, and each half-wave of said closed wavy curve should have a section in the form of an arc of the logarithmic spiral the finite points of which are disposed at a distance from the axis of rotation amounting respectively to about:

$$r_1 = r_{min} + \frac{1-\mu}{2} (r_{max} - r_{min});$$

$$r_2 = r_{min} + \frac{1+\mu}{2} (r_{max} - r_{min});$$

where:

$r_1$, $r_2$ are the distances from the axis of rotation of the driving member to the finite points of the logarithmic curve arc;

$r_{max}$, $r_{min}$ are the maximum and minimum distances from the axis of rotation of the driving member to the trajectory of the point of the axis of the body of revolution.

Such a profile of the wave of the closed wavy surface of the grooved cam provides the constancy of the ratio of the tangential and translational components of the intermediate member motion relative to the driving member during the period of stopping the supporting member. Said constancy of the ratio of values of the components of motion of the intermediate member is one of the conditions providing the absence of variations of the gear ratio value in the process of transmitting motion from the driving member to the driven member through the intermediate member.

It is preferred that a means for rotating a link relatively to the intermediate member be provided with a gear installed on the link coaxially with the axis of rotation thereof relatively to the intermediate member and meshed with a gear connected with a lead screw coaxially with the latter and which forms a rotational kinematic pair with the intermediate member the axis of which is parallel to the axis of rotation of the driving and driven members and is coaxial with the axis of the lead screw and forms a screw kinematic pair the axis of which is coaxial with the axis of the lead screw and a nut forming together with the first ring-shaped member a rectilinear kinematic pair the direction of a relative motion of the members thereof is perpendicular to the axis of rotation of the driving and driven members, the first ring-shaped member forms together with the second ring-shaped member a rotational kinematic pair whose axis of rotation is coaxial with the axis of rotation of the driving and driven members and is perpendicular to the plane of the first ring-shaped member, the second ring-shaped member forms together with the housing a rectilinear kinematic pair the direction of a relative motion of the members thereof is parallel to the axis of rotation of the driving and driven members and is perpendicular to the plane of the second ring-shaped member, and forms together with a regulating means a kinematic pair with a helical relative motion of the members the axis of which is coaxial with the axis of rotation of the regulating means and is parallel to the axis of rotation of the driving and driven members.

Such a design embodiment of the means for rotating the link provides for varying the magnitude of an angle formed by the vector of linear speed of the intermediate member relatively to the supporting member and by the vector of linear speed of the driving member, thereby making it possible to vary the gear ratio in the device through the medium of the regulating means irrespective of the state of motion and angular position of the intermediate member in the housing of the device.

It is desirable that the operative engagement of the stopping means with the driving and driven members be provided with a roller forming together with the stopping means, spring-loaded in the housing, a rotational kinematic pair the axis of rotation of which is parallel to the axis of rotation of the supporting member and being in contact with a cam whose axis of rotation is coaxial with the axis of rotation of the supporting member, and is connected with a carrier of a bevel gear forming together with the driving member a rotational kinematic pair coaxial with the axis of rotation of the driving member and forming together with a bevel gear a rotational kinematic pair the axis of rotation of which is perpendicular to the axis of rotation of the driving and driven members being in meshing with two bevel gears, one of which is installed on the driving member coaxially with the latter and the other one forms together with the housing a rotational kinematic pair the axis of which is coaxial with the axis of rotation of the driving member and through the medium of a gearing, having the gear ratio equal to minus one, is connected with the driven member.

Such a design embodiment of the operative engagement of the stopping means with the driving and driven members insures the stopping of the supporting member in synchronism with phases of motion of the intermediate member in the device comprising one intermediate member and one supporting member.

It is likewise desirable that the operative engagement of each stopping means with the driving and driven members be provided with a roller forming together with the stopping means, spring-loaded in the housing, a kinematic rotational pair whose axis of rotation is parallel to the axis of rotation of the supporting member and being in contact with one of the cams whose axis of rotation is coaxial with the axis of rotation of the supporting member, and each of the cams is connected with a carrier of a bevel gear forming together with the driving member a rotational kinematic pair coaxial with the axis of rotation of the driving member and forming together with a bevel gear a rotational kinematic pair whose axis of rotation is perpendicular to the axis of rotation of the driving and driven members being engaged with two bevel gears, one of which is connected with the driving member and is disposed coaxially therewith and the other one forms together with the housing a rotational kinematic pair whose axis is coaxial with the axis of rotation of the driving member and through the medium of a gearing, having the gear ratio equal to minus one, is connected with the driven member.

Such a design embodiment of the operative engagement of each stopping means with the driving and driven members insures the stopping of each of the supporting members in synchronism with phases of motion of the intermediate member cooperating with each stopping means in the device comprising a plurality of intermediate members and an appropriate number of the supporting members for providing the continuous transmission of motion.

BRIEF DESCRIPTION OF THE DRAWINGS

Other features and advantages of the invention will become evident from the following description in which the specific embodiments are set forth in detail in conjunction with the accompanying drawings, wherein.

DETAILED DESCRIPTION OF THE PREFERRED EMBODIMENTS

Figure 1:
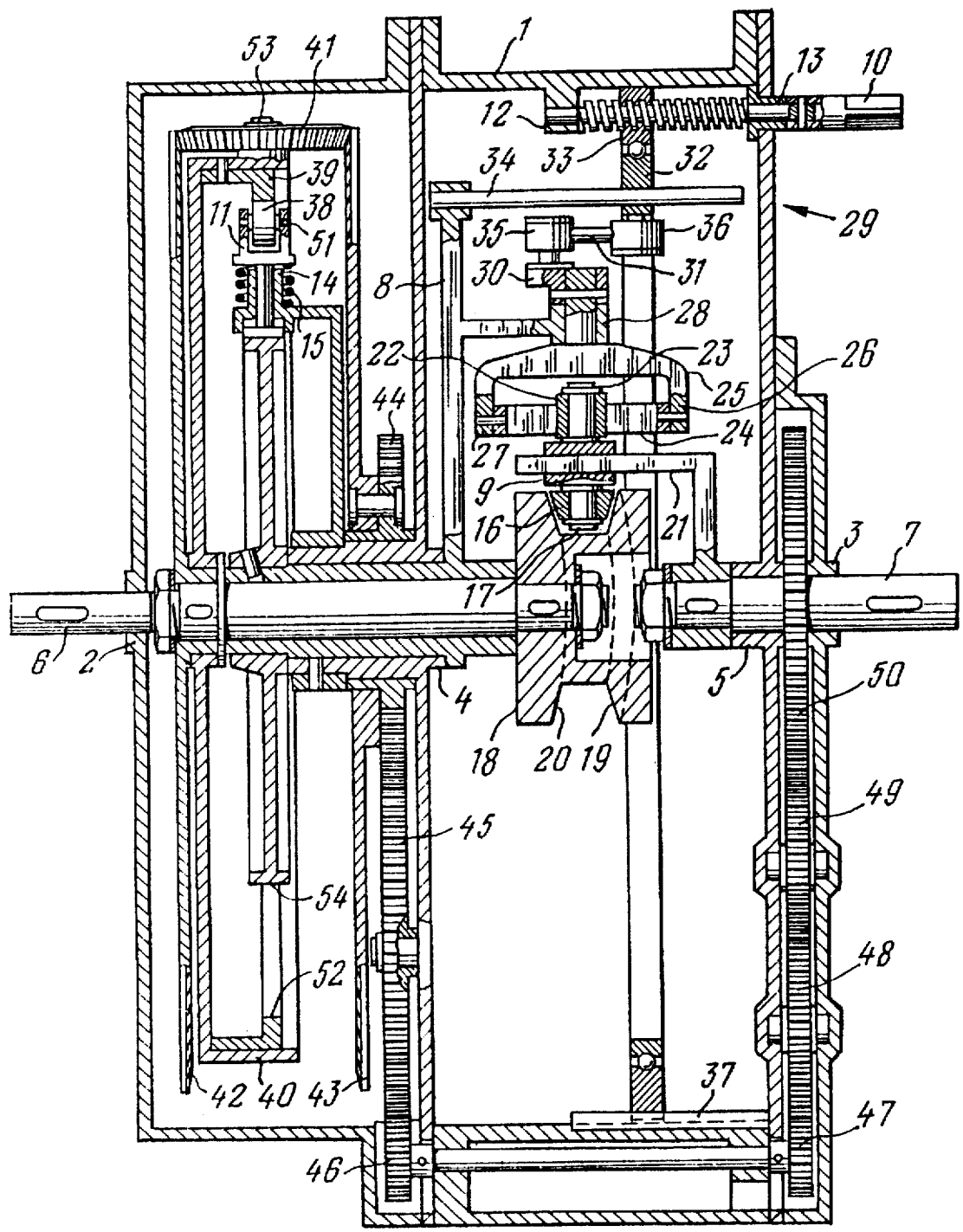
FIG. 1 is a diagrammatical view in longitudinal section of a device for a periodical transmission of motion, according to the invention.

A device for a periodical transmission of motion, according to the invention comprises a housing 1 (FIG. 1) wherein a driving member 6, a driven member 7 and a supporting member 8 are installed for coaxial rotation in bearings 2, 3, 4 and 5. The housing 1 internally accommodates an intermediate member 9, a means 10 for regulating the ratio of rotational speeds of the driving member 6 and the driven member 7, and a means 11 for stopping the supporting member 8. The regulating means 10 whose axis of rotation is parallel to the axis of rotation of the driving member 6, the driven member 7 and the supporting member 8 is installed in bearings 12 and 13 of the housing 1. The stopping means 11 is installed in a guide 14 of the housing 1 for translational motion in the direction perpendicular to the axis of rotation of the supporting member 8 and is preloaded with a spring 15. The intermediate member 9 is in operative engagement with the driving member 6, the driven member 7 and the supporting member 8.

The operative engagement of the supporting member 8 with the driving member 6 is accomplished through the medium of a roller 16 installed for rotation on a journal 17 of the intermediate member 9 and the axis of said roller is perpendicular to the axis of rotation of the driving member 6. The roller 16 is disposed in a groove of a cylindrical grooved cam 18 connected with the driving member 6 and is kept in contact with one of the cam face circular wavy surfaces 19, 20.

The operative engagement of the intermediate member 9 with the driven member 7 being essentially a carrier of the intermediate member 9 is accomplished through the medium of a guide 21 connected with the driven member 7. The guide 21 is rectangular in shape in the cross-section and is disposed in a channel of the intermediate member 9 for motion in the direction parallel to the axis of rotation of the driving member 6 and the driven member 7, said channel being also rectangular in cross-section.

The operative engagement of the intermediate member 9 with the supporting member 8 is effected through the medium of a roller 22 installed for rotation on a journal 23 of the intermediate member 9 being essentially a slide block of a link 24, and the axis of rotation of said roller is perpendicular to the axis of rotation of the supporting member 8. The link 24 is installed in the supporting member 8 through the medium of a fork 25 for rotation relatively to two mutually perpendicular axes one of which coincides with the longitudinal axis of symmetry of a slot of the link 24 and the other one coincides with the axis of rotation of the fork 25 in the supporting member 8 perpendicular to the axis of rotation of the supporting member 8. To this end the link 24 is installed in bearings 26 and 27 of the fork 25 the axes of said bearings are coaxial with and perpendicular to the axis of rotation of the fork 25, and the fork 25 proper is installed in a bearing 28 of the supporting member 8 and is provided with a means 29 for rotating the fork 25 relatively to the supporting member 8.

Said means 29 comprises a lever 30, a connecting rod 31, a first ring-shaped member 32, a second ring-shaped member 33, a rod 34, and said regulating means 10. The lever 30 is connected with the fork 25 and forms together with the connecting red 31 a spherical joint 35 the center of which is offset relatively to the axis of rotation of the fork in the supporting member 8. The connecting rod 31 forms a spherical joint 36 in conjunction with the first ring-shaped member 32 which forms in conjunction with the second ring-shaped member 33 a rotational kinematic pair whose axis of rotation is coaxial with the axis of rotation of the supporting member 8, and in conjunction with the supporting member 8 forms a rectilinear kinematic pair the direction of a relative motion of the members thereof is parallel to the axis of rotation of the supporting member 8. The rectilinear kinematic pair is formed by the rod 34 connnected with the supporting member 8 and slidably passing through a channnel made in the first ring-shaped member 32. The second ring-shaped member 33 forms in conjunction with the housing 1 a rectilinear kinematic pair for which purpose said second ring-shaped member is installed in a bore of the housing 1 and prevented from rotation through the medium of a key 37, and forms with the regulating means 10 a screw kinematic pair being essentially a lead screw.

The stopping means 11 of the supporting member 8 is in operative engagement with the driving and driven members 6 and 7, and comprises a roller 38, the spring 15, a cam 39, a carrier 40 of a bevel gear 41, bevel gears 42 and 43, and cylindrical gears 44, 45, 46, 47, 48, 49 and 50. The roller 38 the axis of which is parallel to the axis of rotation of the supporting member 8 is installed for rotation on an axle 51 of the stopping means 11 and is forced by the effort of the spring 15 against a working surface 52 of the cam 39 installed on the carrier 40 of the bevel gear 41. The cam 39 in conjunction with the carrier 40 is adapted for rotation coaxially with the axis of rotation of the supporting member 8 for which purpose the carrier 40 is movably installed on the driving member 6. The bevel gear 41 is installed for rotation on a journal 53 of the carrier 40 the axis of which is perpendicular to the axis of rotation of the driving member 6, the driven member 7 and the supporting member 8. The bevel gear 41 is in meshing with the bevel gears 42 and 43. The bevel gear 42 is connected with the driving member 6 coaxially therewith. The bevel gear 43 is connected with the cylindrical gear 44 coaxially therewith and installed in the bearing 4 of the housing 1 coaxially with the driving member 6. The cylindrical gear 44 is in operative engagement with a gear ratio equal to minus one with the bevel gear 50 connected with the driven member 7 coaxially therewith, and said operative engagement includes consecutively meshed gears 45, 46, 47, 48 and 49 installed in the housing 1 for rotation.

A disk 54 mounted on the supporting member 8 coaxially therewith is a component part of the supporting member 8 cooperating with the stopping means 11 in the period of stopping the supporting member 8.

A profile of the wave on the development of a section of the face circular wavy surfaces 19, 20 of the grooved cam 18 made by a circular cylindrical surface concentric with the axis of rotation of the driving member 6 presents an equidistant curve on the development of a trajectory of the point of intersection of said cylindrical surface with the axis of the roller 16 being in contact with said wavy surface, and the wave on the development of said trajectory is symmetric about the element of said cylindrical surface passing through the peak of the wave on the development of the trajectory, and each half-wave on the development of the trajectory has a straight section with a constant angle of ascent, projections of finite points of said section onto the height of the wave are arranged at a height amounting respectively to about ½ (1−μ) or to about ½ (1+μ) part of the wave height.

A profile of a section of the working surface 52 of the cam 39 made by the plane perpendicular to the axis of rotation of the cam 39 presents a closed wavy centrally symmetric curve the number of waves located thereon corresponds to a doubled number of waves located on the face wavy surfaces 19, 20 of the grooved cam 18 the center of symmetry of which is on the axis of rotation of the cam 39 and the peaks of waves are facing the axis of rotation of the cam 39, and the peak of each wave has a section being essentially an arc of a circle the center of which is on the axis of rotation of the cam 39. A central angle of said arc is equal to μπ/2K and a central line of the central angle of the arc of one of the waves, and a ray passing from the point on the axis of rotation of the cam 39 and intersecting the axle 51 of the roller 39 form an angle the magnitude of which is equal to one half the magnitude of the angle the vertex of which is on the axis of rotation of the driving member 6 and the driven member 7, and the sides are formed by half-planes, passing from said axis of rotation, one of which passes through the axis of the roller 16 of the intermediate member 9 and the other one divides into two equal parts an arc of the trajectory of one of the points on the axis of the roller 16 having the constant angle of ascent.

Operation of the device for a periodic transmission of motion is accomplished in the following manner.

Let us assume that the regulating means 10 is installed in the starting position in which the longitudinal axis of symmetry of the slot of the link 24 is parallel to the axis of rotation of the driving member 6, the driven member 7 and the supporting member 8, i.e. the angle formed by the longitudinal axis of symmetry of the slot of the link 24 and a circumferential direction relatively to said axis of rotation is equal to the right angle. This position of the members is illustrated in FIG. 1. Being connected to a source of motion, for example, an engine of a transport vehicle, the driving member 6 rotates at a definite speed in conjunction with the gears 42 and 43, the carrier 40 and the cam 39, despite the fact that the driven member 7 connected to a consumer of motion, for example, to a wheel of the transport vehicle remains motionless and, consequently, the gears 50, 49, 48, 47, 45, 45, 44 and 43 also remain motionless. A relative motion of the driving member 6 and the driven member 7 is converted into a relative motion of the intermediate member 9 and the supporting member 8 which, at the given position of the regulating means 10 and the slot 24, represents a translational motion the direction of which is parallel to the axis of rotation of the driving member 6 and the driven member 7. The driving member 6 and the cam 39 keep on moving due to which there comes a moment when the cam 39 actuates the roller 38 and overcoming resistance of the spring 15 forces the stopping means against the disk 54 of the supporting member 8, and thus stops, i.e. holds the supporting member 8 motionless at the expense of friction forces of rest between the stopping means 11 and the disk 54 (though in this mode of operation of the device the supporting member 8 was motionless before the stopping).

The period of stopping the supporting member 8 coincides with the period of motion of the roller 16 of the intermediate member 9 along the section of the face wavy surface of the grooved cam 18 of the driving member 6 having a rectilinear profile on the development of the section of said face wavy surface made by the circular cylindrical surface concentric with the axis of rotation of the driving member 6. This is provided by the given characteristics of profiles of the cam 39, the wavy surface of the cam 18 and the differential kinematic association of the cam 39 with the driving member 6 and the driven member 7. Despite the fact that at this period the supporting member 8 is stopped, motion of the driving member 6 is not transmitted to the driven member 7, as with the link 24 in said position motion of the intermediate member relatively to the supporting member 8 is translational, i.e. the value of the circumferential component of motion of the intermediate member 9 relatively to the axis of rotation of the driving member 6 and the driven member 7 is equal to zero.

Upon expiration of said period the disk 54 of the supporting member 8 is released. The driving member 6 and the gears 42 and 41, the carrier 40 and the cam 39 continue to rotate, while the driven member 7 and the supporting member 8 still remain motionless, as the driven member 7 is connected with a motionless consumer of motion (wheel of transport vehicle), the relative motion of the intermediate member 9 and the driven member 7 is directed in parallel with the axis of rotation of the driving member 6 and the driven member 7, and the relative motion of the intermediate member 9, and the supporting member 8 is also directed in parallel with said axis which is motivated by said position of the link 24.

Therefore the motion of the intermediate member 9 still remains translational, however, as at this period the roller 16 of the intermediate member 9 moves along the section of the wavy surface of the cam 18 the development of the section thereof made by the circular cylindrical surface concentric with the axis of rotation of the driving member 6 has a curvilinear profile, then the translational motion of the intermediate member 9 is retarded up to a complete stop and thereafter motion of the intermediate member 9 is accelerated in the direction opposite to the previous one but as before in parallel with the axis of rotation of the driving member 6 and the driven member 7.

As the driving member 6 continues to move further relatively to the driven member 7, just as in the period of motion of the roller 16 of the intermediate member 9 along the section of the wavy surface of the cam 18 the development of the section thereof made by the circular cylindrical surface concentric with the axis of rotation of the driving member 6 has a rectilinear profile, so in the period of motion of said roller along the section of the wavy surface of the cam 18 the development of the section thereof made by the circular cylindrical surface concentric with the axis of rotation of the driving member 6 has a curvilinear profile, then owing to the reasons mentioned hereinbefore the relative motion of the intermediate member 9 and the supporting member 8 remains translational and the motion from the driving member 6 is not transmitted to the driven member 7. At this stage one cycle of converting the motion of the driven member 7 is completed and a new cycle is started during which all said motions of the members are repeated. As in this case the motion of the driving member 6 is not transmitted to the driven member 7, i.e. the rotational speed of the driven member 7 is equal to zero, then the magnitude of the gear ratio is equal to infinity.

For transmitting motion from the driving member 6 to the driven member 7, it is sufficient in this situation to vary the angular position of the regulating means 10. In this case the second ring-shaped member 33 in conjunction with the first ring-shaped member 32 move in the direction parallel to the axis of rotation of the driving member 6 and the driven member 7, and displace the spherical joint 36 in the same direction. The spherical joint 35 connected by the connecting rod 31 with the joint 36 will move along the arc of a circle through a definite angle around the axis of rotation of the fork 25 in the supporting member 8 and will turn the fork 25 together with the link 24 through the same angle. When the regulating means 10 is turned in one direction away from the starting position the angle formed by the longitudinal axis of symmetry of the slot of the link 24 and the vector of linear speed of the driving member 6 will be acute and its magnitude with the regulating means 10 continuing to rotate in the same direction will diminish, and when the regulating means 10 is turned in the opposite direction away from the starting position said angle will be obtuse and its magnitude with the regulating means 10 continuing to rotate in the same direction will increase.

Both in the first and the second cases, at a period of stopping the intermediate member 9 coinciding with the period of motion of the roller 16 of the intermediate member 9 along the section of a wavy surface of the grooved cam 18 of the driving member 6 having on the development of the section of said wavy surface a rectilinear profile and motion of the intermediate member 9 has two components a translational component parallel to the axis of rotation of the driving member 6 and the driven member 7, and a tangential component which is tangent relatively to said axis. As indicated hereinbefore, the ratio of values of the components of motion of the intermediate member defines the value of the gear ratio in a device for transmitting motion by the proposed method, viz. the device herein described. The tangential component of motion of the intermediate member 9 is transmitted thereto through said operative engagement of the intermediate member 9 with the driven member 7.

Direction of rotation of the driven member 7 and a wheel of a transport vehicle depends on what angle an obtuse or an acute will be formed by the longitudinal axis of symmetry of the slot of the link 24 and the vector of linear speed of the driving member 6 and, consequently, on the direction in which is displaced the regulating means 10 relatively to the starting position. In this case, the value of rotational speed of the driven member 7 and the wheel of the transport vehicle is proportional to the value of rotational speed of the driving member 6 the proportionality factor of which depends on the magnitude of the angle of turn of the regulating means 10 relatively to its own axis of rotation in the housing 1 of a device for transmitting motion. Therefore the speed and direction of motion of the driven member 7 is set by presetting the angular position of the regulating means 10.

During the period of transmitting motion from the driving member 6 to the driven member 7 coinciding with the period of stopping the supporting member 8 the torque is transmitted from the driving member 6 to the driven member 7. And transformation of the torque magnitude takes place at this time due to the fact that the force acting on the intermediate member 9 on the side of the driving member 6 has two components, a tangential one and an axial one, relatively to the axis of rotation of the driving member 6 and the driven member 7. Each of said components develops a torque on the intermediate member 9 and each of the torques is applied to the driven member 7.

The magnitude of the torque developed by the tangential component acting on the intermediate member 9 is equal to the magnitude of the torque of the driving member 6. The magnitude of the torque developed on the intermediate member 9 by the axial component as a result of cooperation of the intermediate member 9 with the supporting member 8 stopped by means of the link 24 the longitudinal axis of symmetry of the slot of said link is disposed at an angle to the axial component of a force acting on the intermediate member 9 depends on the value of said angle and may be varied, in principle, in an unlimited range. However, the magnitude of this torque cannot be greater than the moment of resistance to rotation of the stopped supporting member in cooperation with which the moment is developed. Therefore the maximum magnitude of the torque on the driven member 7 is equal to the sum of the torque on the driving member 6 and the moment of resistance to rotation of the stopped supporting member 8, and the minimum magnitude of the torque on the driven member 7 is equal to zero. The value of the torque on the driven member 7 varies in said range depending on the value of the gear ratio preset by the position of the regulating means 10.

Upon expiration of the period of stopping the supporting member 8 the transmission of motion from the driving member 6 to the driven member 7 is terminated, though each of said members continues to move. The supporting member 8 is freed from the action of the stopping means 11 and starts to rotate with acceleration in the direction coinciding with the direction of the rotational component of motion of the intermediate member 9 during the period in which the roller 16 of the intermediate member 9 moves along the section of the wavy surface of the grooved cam 18 of the driving member 6 having a curvilinear profile on the development of said wavy surface. By the end of this period the value of angular rotational speed of the supporting member 8 becomes equal to the doubled value of the angular speed of the intermediate member 9. Such a value of the ratio of values of said speeds is maintained during the period in which the roller 16 of the intermediate member 9 moves along the section of the wavy surface of the cam 18 having on the development of the section of said wavy surface a rectilinear profile and when the roller 16 moves thereon the translational component of motion of the intermediate member 9 is directed opposite to the direction of the translational component of this member at the period of transmitting motion and stopping the supporting member 8.

And lastly, when the roller 16 moves along the section of the wavy section of the cam 18 having a curvilinear profile on the development of the section of said wavy surface the motion of the supporting member 8 is retarded up to a complete or almost complete stop at the moment when the roller 16 enters the section of the wavy surface of the cam 18 having a rectilinear profile on the development of the section of said wavy surface. By this moment, the cam 39 due to its operative engagement with the driving member 6 and the driven member 7 actuates the roller 38 and overcoming the effort of the spring 15 forces the stopping means 11 against the disk 54 of the supporting member 8 and thus stops the latter. Since that moment starts a next period of transmitting motion and torque from the driving member 6 to the driven member 7 with a gear ratio preset through the medium of the regulating means 10.

Figure 2:
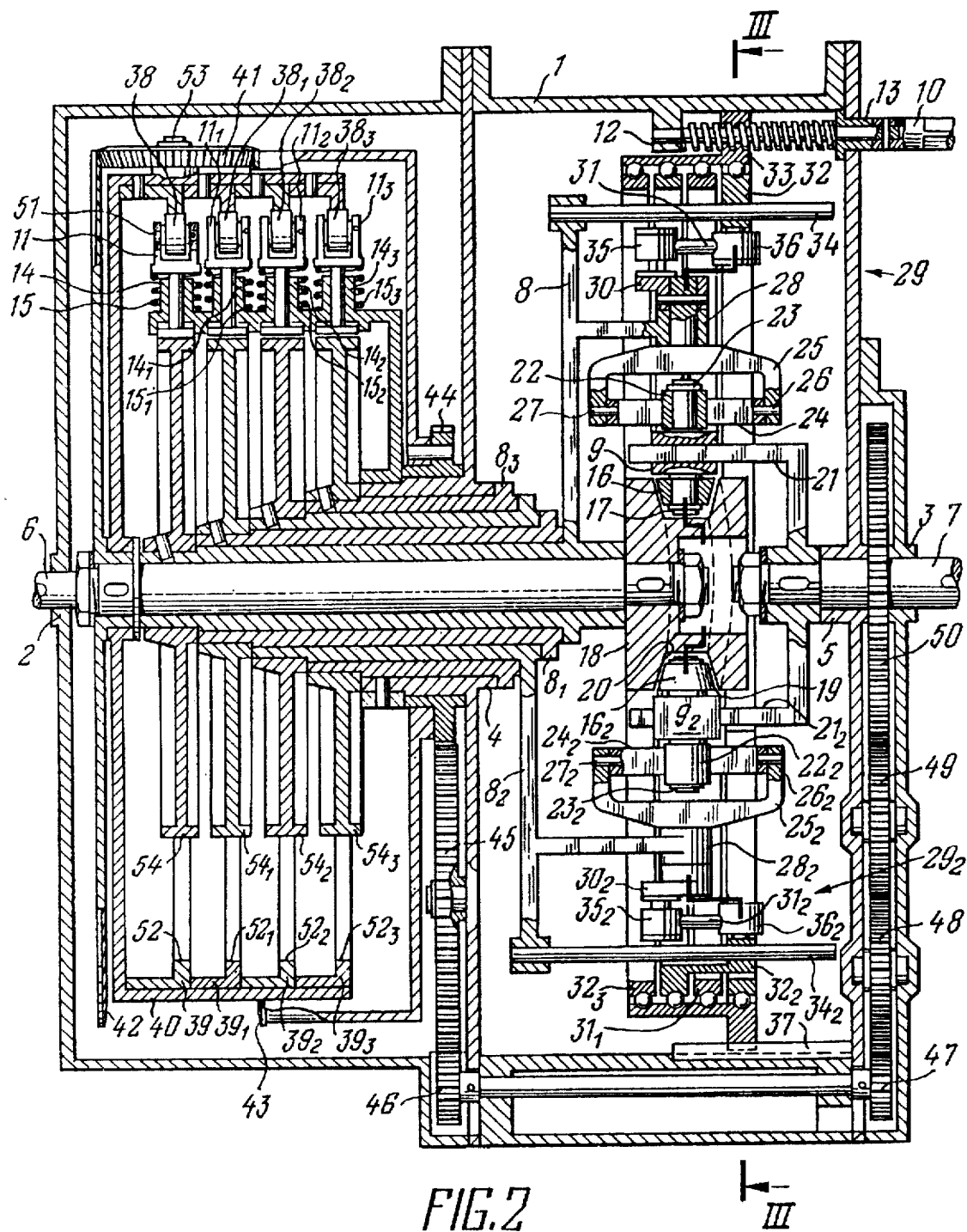
FIG. 2 is a diagrammatical view in longitudinal section of a device for a continuous transmission of motion, according to the invention.
Figure 3:
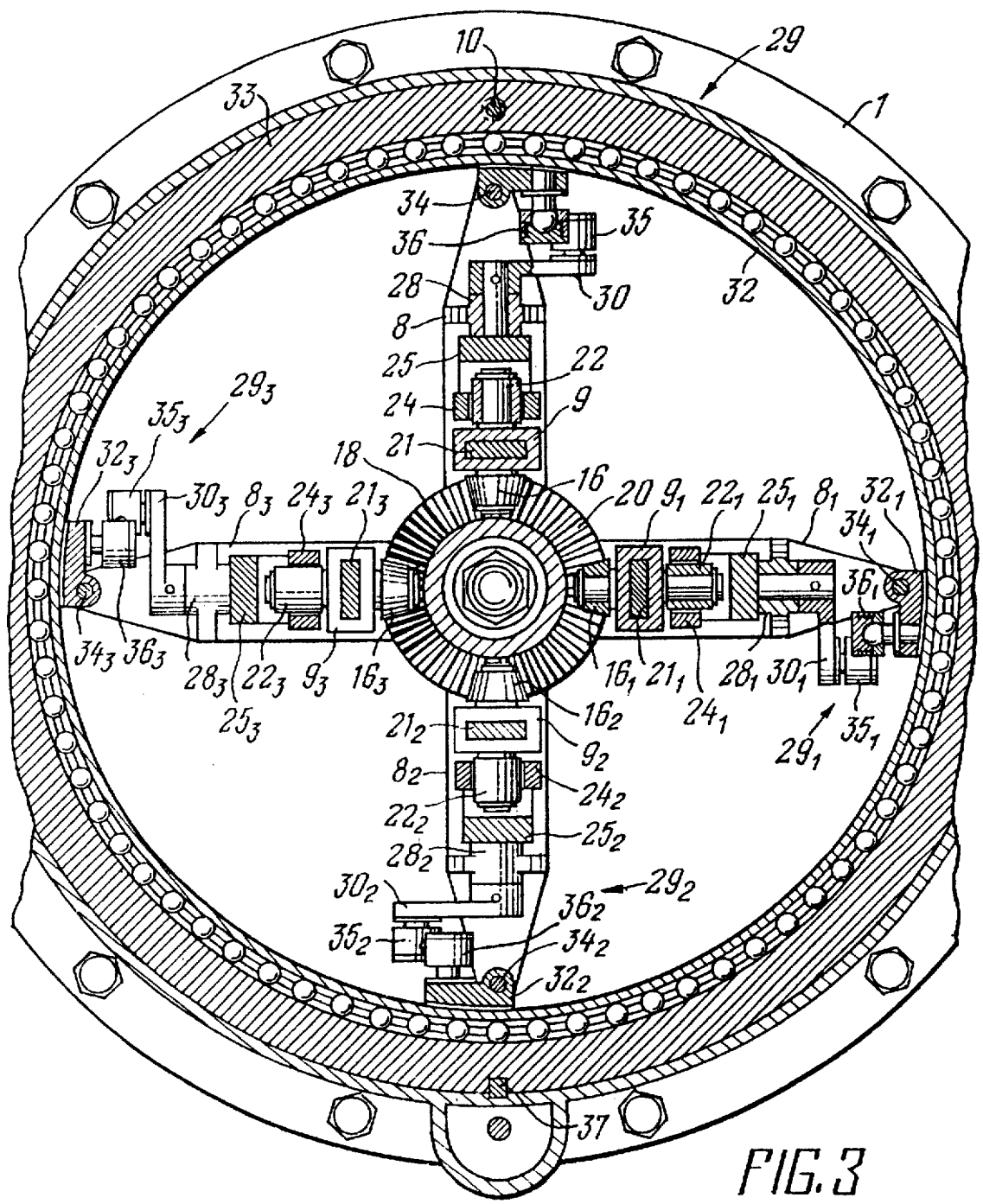
FIG. 3 is a section taken on III—III of FIG. 2.

A device for a continuous transmission of motion shown in FIGS. 2 and 3, according to the invention, comprises all the members and links existing therebetween of a device for a periodic transmission of motion, and additionally incorporates three supporting members $8_1$, $8_2$ and $8_3$, each being in analogous functional application to the supporting member 8 and is also analogous thereto in the embodiment, and incorporates respectively three intermediate members $9_1$, $9_2$ and $9_3$, each being interchangeable with the intermediate member 9.

Each of the supporting members $8_1$, $8_2$ and $8_3$ is installed in the bearing 4 of the housing 1 for coaxial rotation with the supporting member 8, the driving member 6 and the driven member 7.

Each of the intermediate members $9_1$, $9_2$ and $9_3$ is in operative engagement with the driving member 6 and the driven member 7 analogous in its essence to the operative engagement to the same members (the driving member 6 and the driven member 7). The intermediate members 9, $9_1$, $9_2$ and $9_3$ are uniformly spaced in the circumferential direction relatively to the axis of rotation of the driving member 6, the driven member 7 and the supporting members 8, $8_1$, $8_2$ and $8_3$ which is insured by the construction of the driven member 7 which is essentially a carrier of each of the intermediate members and installed on which are four guides 21, $21_1$, $21_2$, and $21_3$ uniformly spaced along the circumferential direction relatively to the axis of rotation of the driven member 7.

The operative engagement of each of the intermediate members $9_1$, $9_2$ and $9_3$ with respective supporting members $8_1$, $8_2$ and $8_3$ by its essence is analogous to the operative engagement of the intermediate member 9 with the supporting member 8. Each of the ring-shaped members $32_1$, $32_2$ and $32_3$ of each from means $29_1$, $29_2$ and $29_3$ for rotating respective forks $25_1$, $25_2$ and $25_3$ relatively to the supporting members $8_1$, $8_2$ and $8_3$ wherein the latter are installed, forms a rotational kinematic pair with the second ring-shaped member 33 which in turn forms a similar kinematic pair with the first ring-shaped member 32 and the axis of rotation of said rotational kinematic pair is coaxial with the axis of rotation of the supporting member 8.

Each of the supporting members $8_1$, $8_2$ and $8_3$ similar to the supporting member 8 is provided with a disk installed thereon and coaxial therewith, viz. $54_1$, $54_2$ and $54_3$. At a period of stopping a respective member from the supporting members $8_1$, $8_2$ and $8_3$ each of the disks $54_1$, $54_2$ and $54_3$ gets in cooperation with a respective means from the stopping means $11_1$, $11_2$ and $11_3$ each being installed in the housing 1 similar to the stopping means 11 and cooperates with a respective cam from the cams $39_1$, $39_2$ and $39_3$ each being installed similar to the cam 39 on the carrier 40 of the bevel gear 41.

The face circular wavy surfaces 19 and 20 of the grooved cam 18, working surfaces 52, $52_1$, $52_2$ and $52_3$ of each of the respective cams 39, $39_1$, $39_2$ and $39_3$ and their arrangement meet the requirements laid down hereinbefore in the description of a device for a periodic transmission of motion. In this case the value of parameter $\mu$ in a device for a continuous transmission of motion comprising four intermediate members 9, $9_1$, $9_2$ and $9_3$ has the value greater than 0.5, for example, 0.6.

A device for a continuous transmission of motion operates in the following manner. Let us assume that the regulating means 10 is set (turned) in the starting position in which the longitudinal axis of symmetry of the slot of each of the links 24, $24_1$, $24_2$ and $24_3$ is parallel to the axis of rotation of the driving member 6 and the driven member 7, i.e. the angle formed by the longitudinal axis of symmetry of the slot of each link 24, $24_1$, $24_2$ and $24_3$ with a circumferential direction relatively to said axis of rotation is equal to the right angle. This position of the members is illustrated in FIGS. 2 and 3. When a torque is applied to the driving member 6 it starts to rotate. As the device comprises four intermediate members 9, $9_1$, $9_2$ and $9_3$, four supporting members 8, $8_1$, $8_2$ and $8_3$, four stopping means 11, $11_1$, $11_2$ and $11_3$ and four cams 33, $33_1$, $33_2$ and $33_3$ with a previously described profile of the working surfaces 52, $52_1$, $52_2$, $52_3$ and the value of parameter $\mu$ is equal to 0.6, then at any instant one of the disks 54, $54_1$, $54_2$ and $54_3$ and, consequently, one of said supporting members are stopped. As the longitudinal axis of symmetry of each of the links 24, $24_1$, $24_2$ and $24_3$ and, consequently, of the slot of the link installed in a stopped supporting member, in this case, in the supporting member 8, is parallel with the axis of rotation of the driving member 6 and the driven member 7, then under the action of the rotating cam 18 the intermediate member 9 translates in the direction parallel to the axis of rotation of the driving member 6 and the driven member 7. Therefore the driven member 7, forming in conjunction with the intermediate member 9 a rectilinear kinematic pair, remains motionless. The intermediate members $9_1$, $9_2$ and $9_3$ in conjunction with the driven member 7 remain motionless circumferentially relative to the axis of rotation of the driven member 7 despite the fact that the supporting members $8_1$, $8_2$ and $8_3$ are not stopped. This is conditioned by that the intermediate members $9_1$, $9_2$ and $9_3$ are connected with the intermediate member 9 through the medium of the driven member 7. With the links 24, $24_1$, $24_2$ and $24_3$ in said position all the intermediate members 9, $9_1$, $9_2$ and $9_3$ perform a translational motion under the action of the rotating cam 18 of the driving member 6. As the intermediate members 9, $9_1$, $9_2$ and $9_3$ are uniformly spaced circumferentially relative to the axis of rotation of the driving member 6 and their rollers respectively 16, $16_1$, $16_2$ and $16_3$ are in different positions on the wavy surface of the cam 18, then the phases of the translational motion of said intermediate members are different.

For example, with the members being in the position shown in FIG. 2 and FIG. 3 the driving member 6 uniformly rotates clockwise, the intermediate member 9 translates at a constant speed in the direction from the driving member 6 towards the driven member 7, the intermediate members $9_1$ and $9_3$ remain motionless, and the intermediate member $9_2$ translates at a constant speed in the direction from the driven member 7 to the driving member 6. In this position the intermediate member $9_1$ has an acceleration the vector of which is directed in parallel with the axis of rotation of the driving member 6 from the driven member 7 to the driving member 6 and the intermediate member $9_3$ has an acceleration in the opposite direction. When the driving member 6 continues to rotate and the period of stopping the supporting member 8 comes to completion, there takes place an alternative stopping of the supporting members $8_1$, $8_2$, $8_3$, 8 ... and so forth, insured by the operative engagement of the stopping means $11_1$, $11_2$, $11_3$, 11 with the driving member 6 and the driven member 7 having previously described characteristics and arrangement of the members in these kinematic connections, and there also takes place a change in the phases of the translational motion of each of the intermediate members 9, $9_1$, $9_2$ and $9_3$ in synchronism with the periods of stopping the supporting members insured by the kinematic connections of each of the intermediate members with the driving member 6 and the driven member 7, and with one of the supporting members 8 characterized hereinbefore. Periods of motion of each of the intermediate members are similar to periods of motion of the intermediate member given hereinbefore in the description of operation of a device for a periodic transmission of motion.

With the regulating means 10 in said position and with the links 24, $24_1$, $24_2$ and $24_3$ in the relevant positions the rotation of the driving member 6 provides a reciprocating motion of the intermediate members 9, $9_1$, $9_2$ and $9_3$, rotation of gears 42 and 41 with the carrier 40 and the cams 39, $39_1$, $39_2$ and $39_3$, rotation of the rollers 38, $38_1$, $38_2$ and $38_3$ and a periodic translational motion of the stopping means 11, $11_1$, $11_2$ and $11_3$ with the springs 15, $15_1$, $15_2$ and $15_3$. All other members of the device including the driven member 7 remain motionless and the value of the gear ratio is equal to infinity, i.e. the motion is not transmitted from the driving member 6 to the driven member 7. Moreover, the driven member 7 is stopped despite the fact that the driving member 6 is rotating.

For transmitting motion (and torque) from the driving member 6 to the driven member 7 in this situation, it is sufficient to change the angular position of the regulating means 10 in supports 12 and 13 of the housing 1. In this case the second ring-shaped member 33 together with the first ring-shaped members 32, $32_1$, $32_2$ and $32_3$ will move in the direction parallel to the axis of rotation of the driving member 6 and the driven member 7, and will shift the spherical joints 36, $36_1$, $36_2$ and $36_3$ in the same direction and through the same distance. The spherical joints 36, $36_1$, $36_2$ and $36_3$ each of which will be connected through the medium of respective connecting rods 31, $31_1$, $31_2$ and $31_3$ with a respective one of the spherical joints 36, $36_1$, $36_2$ and $36_3$ will move along the arc of a circle through a definite angle about the axis of rotation of a respective one of the forks 25, $25_1$, $25_2$ and $25_3$ in a respective one of the supporting members 8, $8_1$, $8_2$ and $8_3$. Each of the forks 25, $25_1$, $25_2$ and $25_3$ in conjunction with the links 24, $24_1$, $24_2$ and $24_3$ installed thereon will turn through the same angle. When the regulating means 10 is turned in one direction from the starting position the angle formed by the longitudinal axis of symmetry of the slot of each of the links 24, $24_1$, $24_2$ and $24_3$ and the vector of linear speed of the driving member 6 will be acute and its magnitude will decrease as the regulating means 10 is being turned in the same direction, and when the regulating means 10 is turned in the opposite direction said angle will be obtuse and its magnitude will increase when the regulating means 10 is being turned in the same direction.

In both cases the motion of one of the intermediate members 9, $9_1$, $9_2$ and $9_3$ whose supporting member from the supporting members 8, $8_1$, $8_2$ and $8_3$ is stopped at the moment under review has two components, a translational one (axial) which is parallel to the axis of rotation of the driving member 6 and the driven member 7, and a tangential one which is tangential relatively to said axis. And in the first case, i.e. when said angle is acute the direction of the tangential component of the intermediate member motion being tangential coincides with the direction of the driving member linear speed in the plane parallel to the vectors of the translational and tangential components of the intermediate member motion, and in the second case, i.e. when said angle is obtuse the direction of the tangential component of the intermediate member motion being tangential is opposite to the direction of the linear speed of the driving member in the plane parallel to the vectors of the translational and the tangential components of the intermediate member motion. In other words, the intermediate member performing the translational motion rotates, in the first case, in the same direction relatively to the axis of rotation of the driving member as does the driving member, and in the second case the intermediate member rotates in the direction opposite to the direction of rotation of the driving member.

The ratio of values of said components of the intermediate member motion, as described hereinbefore, defines the value of a gear ratio of a device based on the proposed method for a continuous transmission of motion.

The tangential component of motion of one of the intermediate members 9, $9_1$, $9_2$ and $9_3$, whose supporting member from the supporting members 8, $8_1$, $8_2$ and $8_3$ is stopped at the moment under review, is transmitted through the medium of the operative engagement including a respective guide from the guides 21, $21_1$, $21_2$ and $21_3$ of the same intermediate member to the driven member 7, and by means of the operative engagement including said respective guides is transmitted from the driven member 7 to each of the intermediate members the supporting members of which are not stopped at the moment under review.

When the driving member 6 is uniformly rotating and the regulating means 10 is kept in the preset position, i.e. when the value of gear ratio is constant the tangential component of motion of each of the intermediate members has a constant value and direction, whereas the translational components of motion of each of the intermediate members is changing in value and direction, sequentially passing through all the periods of its own changing similar to the periods of the translational motion of the intermediate member with the regulating means 10 set in the starting position in which the tangential component of motion of the intermediate member is equal to zero. The periods of changing of the translational component of motion of the intermediate member in the course of transmitting motion incorporate a period of the uniform translational motion in the direction from the driving member 6 to the driven member 7 coinciding with the period of stopping a respective supporting member from the supporting members, a period of deceleration of the translational motion of the intermediate member from the driving member 6 to the driven member 7 up to its complete stopping and its subsequent acceleration in the direction from the driven member 7 to the driving member 6, a period of a uniform translational motion of the intermediate member from the driven member 7 to the driving member 6, and a period of deceleration of the translational motion of the intermediate member from the driven member 7 to the driving member 6 up to its complete stopping and its subsequent acceleration in the direction from the driving member 6 to the driven member 7. In this case the development of a trajectory of motion of any point of the intermediate member is essentially a sine-shaped curve having the constant amplitude and the length of a wave. And the phases of motion of the intermediate members are different.

In case of a nonuniform motion of the driving member 6 or in case of a change in the position of the regulating means 10, or in both cases the translational and the tangential components of motion of the intermediate member in any period of its motion will be variable, however the instantaneous value of the ratio of the values of said components, in the period of stopping a respective supporting member, will correspond to the instantaneous position of the regulating means 10. Therefore, the setting of an angular position of the regulating means 10 is essentially the presetting of components of motion of each intermediate member in the period of stopping a respective supporting member from said intermediate members and, consequently, is the presetting of the gear ratio. As the periods of an alternate stopping of the supporting members with said number of the intermediate members in the device and with the value μ are overlapping, then the transmission of motion from the driving member 6 to the driven member 7 with a preset gear ratio will be continuous.

The transmission of torque from the driving member 6 to the driven member 7 in a device for a continuous transmission of motion is accomplished through the medium of each of the intermediate members 9, 9$_1$, 9$_2$ and 9$_3$ in full compliance with the manner in which it is accomplished in a device for a periodic transmission of motion, with the only difference that in a device for a continuous transmission of motion separate consecutive periods of transmitting the torque through the medium of each from the intermediate members coinciding with the consecutive periods of stopping the supporting members 8, 8$_1$, 8$_2$ and 8$_3$ is essentially a continuous process. Conversion of the torque and its direction are governed by value of the gear ratio,: i.e. by the position of the regulating means 10.

Each of the supporting members 8, 8$_1$, 8$_2$ and 8$_3$ in the periods of time between the periods of its stopping being connected through the medium of a differential operative engagement, including respective members from the intermediate members 9, 9$_1$, 9$_2$ or 9$_3$, with the driving member 6 and the driven member 7 is moving in the same manner as is laid down hereinbefore in the description of operation of a device for a periodic transmission of motion. In this case the phases of motion of the supporting member are in full correspondence with the phases of motion of the intermediate member cooperating with the supporting member due to which the phases of motion of the supporting members are different.

It is worth noting from the standpoint of application a very substantial feature of motion of the supporting members in a device for a continuous transmission of motion residing in that in any mode of operation of the device each of the supporting members in the housing of the device is stopped or fixed when it is motionless. That is each of the supporting members is stopped due to its cooperation with a respective member and only after its speed becomes equal to zero is fixed in the housing of the device by a respective stopping means.

An alternative embodiment of the device for a periodic transmission of motion, according to the invention comprises a housing 55 (FIG. 4), wherein are installed in bearings 56, 57, 58 and 59 for coaxial rotation a driving member 60, a driven member 61 and a supporting member 62. The housing 55 internally accommodates an intermediate member 63, a means 64 for regulating the ratio of rotational speeds of the driving member 60 and the driven member 61, and a means 65 for stopping the supporting member 62. The regulating means 64 the axis of rotation of which is parallel to the axis of rotation of the driving member 60, the driven member 61 and the supporting member 62 is installed in bearings 66 and 57 of the housing 55. The stopping means 65 is installed in a guide 68 of the housing 55 for a translational motion in the direction perpendicular the axis of rotation of the supporting member 62 and is preloaded with a spring 69. The intermediate member 63 is in operative engagement with the driving member 60, the driven member 61 and the supporting member 62, The operative engagement of the intermediate member 63 with the driving member 60 is accomplished through the medium of a roller 70 installed for rotation on a journal 71 of the intermediate member 63 and the axis of said roller is parallel to the axis of rotation of the driving member 60. The roller 70 is disposed in a groove of a face grooved cam 72 connected with the driving member 60 and is in contact with one of the cam closed wavy surfaces 73, 74.

The operative engagement of the intermediate member 63 with the driven member 61 presented by a carrier of the intermediate member 63 is accomplished through the medium of a guide 75 connected with the driven member 61. The guide 75 being rectangular in shape in the cross-section is installed in a rectangular channel of the intermediate member 63 for motion in the direction perpendicular to the axis of rotation of the driven member 61.

The operative engagement of the intermediate member 63 with the supporting member 62 is effected through the medium of a roller 76 installed for rotation on a journal 77 of the supporting member 62 being essentially a slide block of a link 78, and the axis of rotation of said roller is parallel to the axis of rotation of the supporting member 62. The link 78 is installed on a journal 79 of the intermediate member 63 for rotation the axis of which is parallel to the axis of rotation of the supporting member 62 and perpendicular to the longitudinal axis of symmetry of a slot of the link 78 and is provided with a means 80 for rotating the link 78 relatively to the intermediate member 63.

Said means 80 comprises gears 81 and 82, a lead screw 83, a nut 84, the first ring-shaped member 85 and the second ring-shaped member 86. The gear 81 is installed on the link 78 coaxially with the axis of rotation thereof relatively to the intermediate member 63 and is meshed with the gear 82. The gear 82 is installed on the lead screw 83 coaxially with the axis of rotation thereof coinciding with its own longitudinal axis and being parallel to the axis of rotation of the driving member 60 and the driven member 61. The lead screw is installed on bearings 87 and 88 of the intermediate member 63 and forms a screw pair the axis of which is coaxial with the lead screw 83 and the nut 84 forming with the first ring-shaped member 85 a rectilinear kinematic pair with the direction of a relative motion of the members thereof being perpendicular to the axis of rotation of the driving member 60 and the driven member 61. The last kinematic pair is formed by a rod 89 connected with the nut 84 and with a rod guide in the first ring-shaped member 85. The first ring-shaped member 85 and the intermediate member 63 form a three-way kinematic pair one direction of a relative translational motion of the members thereof is perpendicular to the axis of rotation of the driving member 60 and the driven member 61, another direction of a relative motion of the members of said kinematic pair is parallel to said axis, and a third rotational relative motion of the members of said kinematic pair the axis of which is perpendicular to two said directions. The third rotational mobility of the members of said kinematic pair is not used because of the operative engagement of the intermediate member 63 and the first ring-shaped member 85 with other kinematic members. Said kinematic pair is essentially a slot 90 made in the first ring-shaped member 85 which accommodates the intermediate member 63 adapted for sliding in two said directions. The first ring-shaped member 85 together with the second ring-shaped member 86 also forms a rotational kinematic pair the axis of rotation of which is coaxial with the axis of rotation of the driving member 60 and the driven member 61, and said second ring-shaped member 86 forms together with the housing 55 a rectilinear kinematic pair for which purpose it is installed in a bore of the housing 55 and is prevented from any possibility of rotation by means of a key 91, and forms a screw pair with the regulating means 64 being essentially a lead screw.

The stopping means 65 of the supporting member 62 is operatively engaged with the driving member 60 and the driven member 61 comprising a roller 92, a spring 69, a cam 93, a carrier 94 of a bevel gear 95, bevel gears 96 and 97, and cylindrical gears 98, 99, 100, 101, 102, 103 and 104. The roller 92 is installed on an axle 105 of the stopping means 65 for rotation the axis of which is parallel to the axis of rotation of the supporting member 62, and said roller 92 is forced by the spring 69 against a working surface 106 of the cam 93 installed on the carrier 94 of the bevel gear 95. The cam 93 together with the carrier 94 is adapted for rotation coaxially with the axis of rotation of the supporting member 62 for which purpose the carrier 94 is movably installed on the driving member 60. The bevel gear 95 is installed for rotation or a journal 107 of the carrier 94 the axis of which is perpendicular to the axis of rotation of the driving member 60 and the driven member 61. The gear 95 is meshed with the bevel gears 96 and 97. The gear 96 is connected with the driving member 60 coaxially therewith. The gear 97 is connected with the cylindrical gear 98 coaxially therewith and is installed in the bearing 58 of the housing 55 coaxially with the driving member 60. The gear 98 is operatively engaged at a ratio equal to minus one with the gear 104 connected with the driving member 60 coaxially therewith and comprising a simple consecutive gear train including the gears 99, 100, 101, 102 and 103 installed in the housing 55 for rotation.

A disk 108 being essentially an element of the supporting member 62 cooperating with the stopping means 65 in the period of stopping the supporting member 62 is installed on the supporting member 62 coaxially therewith.

The profile of a section of the closed wavy surfaces 73, 74 of the face grooved cam 72 made by the plane perpendicular to the axis of rotation of the driving member 60 is essentially an equidistant curve of the trajectory of the point where said plane intersects with the axis of the cam 70 presenting a wavy closed curve each wave of which is symmetric about the straight line belonging to said plane and passing through the peak of a wave and the axis of rotation of the driving member 60, and each half-wave thereof has a section which is essentially an arc of a logarithmic spiral (having a constant angle of ascent) the finite points of which are disposed at a distance away from the axis of rotation of the driving member 60 amounting, respectively, to:

$$r_1 = r_{min} + \frac{1-\mu}{2}(r_{max} - r_{min});$$

$$r_2 = r_{min} + \frac{1+\mu}{2}(r_{max} - r_{min});$$

where:

$r_1, r_2$ is the distance from the axis of rotation of the driving member to the finite points of the arc of the logarithmic spiral;

$r_{min}, r_{max}$ is minimum and maximum distances from the axis of rotation of the driving member to the trajectory of the point of the roller axis.

The profile of a section of the working surface 106 of the cam 93 made by the plane perpendicular to the axis of rotation of the cam 93 is essentially a closed wavy centrally symmetric curve the center of symmetry of which is on the axis of rotation of the cam 93 and the number of waves thereon corresponds to a doubled number of the waves on the wavy surfaces 73, 74 of the grooved cam 72 the peaks of waves on said surfaces are facing the axis of rotation of the cam 93 and the peak of each wave has a section in the form of an arc of the circle the center of which is on the axis of rotation of the cam 93. The central angle of said arc is equal to $\mu\pi/2K$ and the median of the central angle of the arc of one of the waves and a ray passing from the point of the axis of rotation of the cam 93 and intersecting the axle 105 of the roller 92 form an angle the magnitude of which is equal to one half the part of the magnitude of the angle whose vertex is on the axis of rotation of the driving member 60 and the driven member 61 and sides formed by half-planes issueing from said axis of rotation, one of which passes through the axis of the roller 70 of the intermediate member 63 and the other one bisects the central angle of the section of the trajectory of one of the points on the axis of the roller 70, said section being essentially the arc of a logarithmic spiral.

Figure 4:
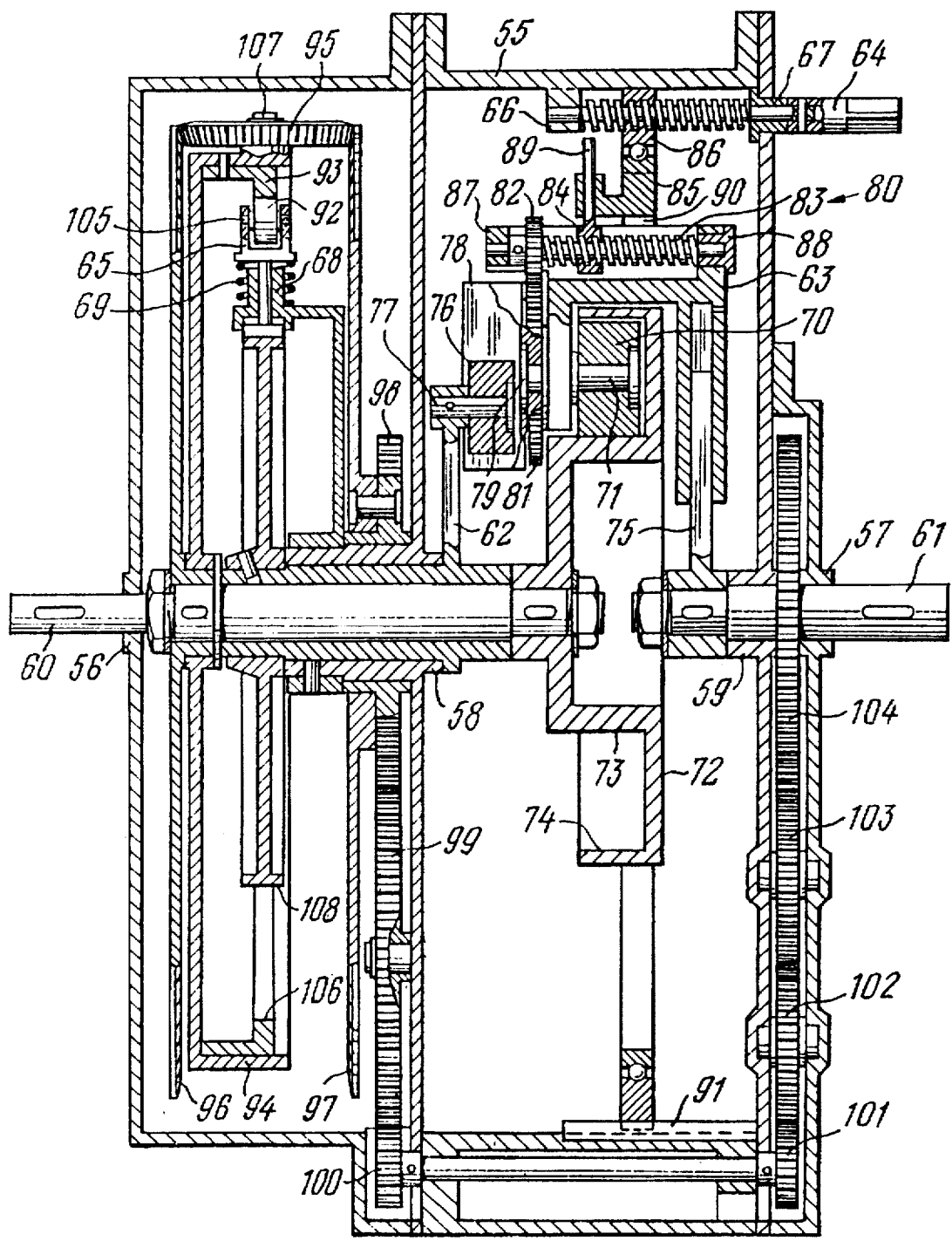
FIG. 4 is a diagrammatical view in longitudinal section of an alternative embodiment of a device for a periodical transmission of motion, according to the invention.

Operation of an alternative embodiment of the device for a periodic transmission of motion is accomplished in the following manner. Let us assume that the regulating, means 64 is installed in the starting position in which the longitudinal axis of symmmetry of the slot of the link 78 is perpendicular to the axis of rotation of the driving member 60 and the driven member 61, i.e. the angle formed by the longitudinal axis of symmetry of the slat of the link 78 and a circumferential direction relatively to said axis of rotation is equal to the right angle. This position of the members is illustrated in FIG. 4. Being connected to a source of motion, for example, an engine of a transport vehicle, the driving member 60 rotates at a definite speed. Rotating in conjunction with said driving member 60 are the gears 96 and 95, the carrier 94 and the cam 93, despite the fact that the driven member 61 connected to a consumer of motion, for example, to a wheel of the transport vehicle remains motionless and, consequently, the gears 104, 103, 102, 101, 100, 99, 98 and 97 also remain motionless.

A relative motion of the driving member 60 and the driven member 61 is converted into the relative motion of the intermediate member 63 and the supporting member 62 which with the regulating means 64 and the link 78 in the given position represents a translational motion the direction of which is perpendicular to the axis of rotation of the driving member 60 and the driven member 61. The driving member 60 and the cam 93 keep on moving due to which there comes a moment when the cam 93 actuates the roller 92 and overcoming resistance of the spring 69 forces the stopping means 65 against the disk 108 of the supporting member 62, and thus stops, i.e. holds the supporting member 62 motionless at the expense of friction forces of rest between the stopping means 65 and the disk 108.

The period of stopping the supporting member 62 coincides with the period of motion of the roller 70 of the intermediate member 63 along the section of the wavy surface of the grooved cam 72 of the driving member 60 having the profile of the section of the wavy surface made by the plane perpendicular to the axis of rotation of the driving member 60, with the constant angle of ascent. This is provided by the given characteristics of profiles of the cam 93, by the wavy surface of the grooved cam 72 and the differential operative engagement of the cam 93 with the driving member 60 and the driven member 61. Despite the fact that at this period the supporting member 62 is stopped, motion of the driving member 60 is not transmitted to the driven member 61, as with the link 78 in said position motion of the intermediate member 63 relatively to the supporting member 62 is translational and its direction is perpendicular to the axis of rotation the driving member 60, the driven member 61 and the supporting member 62, i.e. the value of the tangential component of motion of the intermediate member 63 relatively to the axis of rotation of said axis is equal to zero.

Upon expiration of said period the disk 108 of the supporting member 62 is released. The driving member 60 and the gears 96, 95, the carrier 94 and the cam 93 continue to rotate, while the driven member 61 and the supporting member 62 still remain motionless, as the driven member 61 is connected with a motionless consumer of motion (wheel of transport vehicle), the relative motion of the intermediate member 63 and the driven member 61 is directed perpendicularly to the axis of rotation of the driving member 60 and the driven member 61, and the relative motion of the intermediate member 63 and the supporting member 62 is also directed perpendicularly to said axis which is motivated by said position of the link 78. Therefore the motion of the intermediate member 63 still remains translational, however, as at this period the roller 70 of the intermediate member 63 moves along the section of the wavy surface of the cam 72 having the profile of its section with a variable angle of ascent, then the translational motion of the intermediate member 63 is retarded up to a complete stop and thereafter motion of the intermediate member 63 is accelerated in the direction opposite to the previous one but as before perpendicular to the axis of rotation of the driving member 60 and the driven member 61.

As the driving member 60 continues to move further relatively to the driven member 61, the relative motion of the intermediate member 63 and the supporting member 62, just as in the period of motion of the roller 70 of the intermediate member 63 along the section of the wavy surface of the cam 72 having the profile of its section with a constant angle of ascent, so in the period of motion of said roller along the section of the wavy surface of the cam 72 having the profile of its section with a variable angle of ascent remains translational due to the reasons mentioned hereinbefore, and the motion from the driving member 60 is not transmitted to the driven member 61. At this stage one cycle of converting the motion of the intermediate member 63 is completed and a new cycle is started during which all said motions of the members are repeated. As in this case the motion of the driving member 60 is not transmitted to the driven member 61, i.e. the speed of motion of the driven member 61 is equal to zero, then the magnitude of the gear ratio is equal to infinity on condition that the regulating means 64 is in said, i.e. in the starting position.

For transmitting motion from the driving member 60 to the driven member 61, it is sufficient in this situation to vary the angular position of the regulating means 64. In this case the second ring-shaped member 86 in conjunction with the first ring-shaped member 85 move in the direction parallel to the axis of rotation of the driving member 60 and the driven member 61, and displace the nut 84. In this case the lead screw 83 in conjunction with the gear 82 will turn through a definite angle relatively to the intermediate member 63 in the bearings 87, 88 and will turn through a definite angle the gear 81 together with the link 78 relatively to the intermediate member 63 on the journal 79. When the regulating means 64 is turned in one direction away from the starting position the angle formed by the longitudinal axis of symmetry of the slot of the link 78 and the vector of linear speed of the driving member 60 will be acute and its magnitude when the regulating means 64 is still rotated in the same direction will diminish, and when the regulating means 64 is turned in the opposite direction away from the starting position said angle will be obtuse and its magnitude when the regulating means 64 is still turned in the same direction will increase.

Both in the fist and the second cases, at a period of stopping the supporting member 62 coinciding with the period of motion of the roller 70 of the intermediate member 63 along the section of a wavy surface of the cam 72 having the profile of its section with a constant angle of ascent, the motion of the intermediate member 63 has two components, a translational component perpendicular to the axis of rotation of the driving member 60 and the driven member 61, and a tangential component which is tangent relatively to said axis. As indicated hereinbefore, the ratio of values of the components of motion of the intermediate member defines the value of the gear ratio when transmitting motion by the proposed method on which is based an alternative embodiment of the device for a periodic transmission of motion described hereinbefore. The rotational component of motion of the intermediate member 63 is transmitted to the driven member 61 through said operative engagement of the intermediate member 63 with the driven member 61 including the guide 75 of said intermediate member 63. In this case the intermediate member 63 and the driven member 61 are rotating at an angular speed equal in value and identical in direction.

Direction of rotation of the driven member 61 and a wheel of a transport vehicle depends on what angle an obtuse or an acute will be formed by the longitudinal axis of symmetry of the slot of the link 78 and the vector of linear speed of the driving member 60 and, consequently, on the direction in which is displaced the regulating means 64 relatively to the starting position. In this case, the value of rotational speed of the driven member 61 is proportional to the value of rotational speed of the driving member 60 the proportionality factor of which depends on the magnitude of the angle of turn of the regulating means 64 relatively to its own axis of rotation in the housing 55 of an alternative embodiment of a device for a periodic transmission of motion. Therefore the speed and direction of motion the driven member 61 is set by presetting the angular position of the regulating means 64.

During the period of transmitting motion from the driving member 60 to the driven member 61 coinciding with the period of stopping the supporting member 62 the torque is transmitted from the driving member 60 to the driven member 61. And transformation of the torque magnitude takes place at this time due to the fact that the force acting on the intermediate member 63 on the side of the driving member 60 has two components, a tangential one and a radial one relatively to the axis of rotation of the driving member 60 and the driven member 61. Each of said components develops a torque on the intermediate member 63 relatively to said axis and each of the torques is applied to the driven member 61. The magnitude of the torque developed by the tangential component of said force is equal to the magnitude of the torque of the driving member 60. The magnitude of the torque developed by the radial component of said force, as a result of cooperation of the intermediate member 63 with the supporting member 62 stopped by means of the link 78 the longitudinal axis of symmetry of the slot of said link is disposed at an angle to the radial component of the force acting on the intermediate member depends on the magnitude of said angle and may be varied, broadly speaking, in an unlimited range. However, it Should be taken into account that this component of the torque is developed as a result of cooperation of the intermediate member 63 with the stopped supporting member 62, then it becomes apparent that the maximum magnitude of said component of the torque cannot be greater than the moment of resistance to the turning of the stopped supporting member 62 relatively to its own axis of rotation, Therefore the torque magnitude of the driven member 61 varies depending on the value of the gear ratio preset by the position of the regulating means 64 in a range from zero to the value equal to the sum of the torque on the driving member 60 and the moment of resistance to rotation of the stopped supporting member 62.

Upon expiration of the period of stopping the supporting member 62 the transmission of motion from the driving member 60 to the driven member 61 is terminated, though each of said members continues to move. The supporting member 62 is freed from the action of the stopping means 65 and starts to rotate with acceleration, due to cooperation with the intermediate member 63, in the direction coinciding with the direction of the rotational component of motion of the intermediate member 63 during the period in which the roller 70 moves along the section of the wavy surface of the cam 72 having the profile of its section with a variable angle of ascent. By the end of this period the value of the angular rotational speed of the supporting member 62 becomes equal to the doubled value of the angular speed of the intermediate member 63. Such a value of the ratio of values of said speeds is maintained during the period in which the roller 70 of the intermediate member 63 moves along the section of the wavy surface of the cam 72 having the profile of its section with a constant angle of ascent and when the roller 70 moves along said wavy surface the translational component of motion of the intermediate member 63 is directed opposite to the direction of the translational component of motion of this intermediate member 63 at the period of transmitting motion and stopping the supporting member 62. And lastly, when the roller 70 moves along the section of the wavy surface of the cam 72 having the profile of its section with a variable angle of ascent the rotational motion of the supporting member 62 is retarded up to a complete or almost complete stop at the moment when the roller 70 enters the section of the wavy surface of the cam 72 having the profile of its section with a constant angle of ascent. By this moment, the cam 93 due to its operative engagement with the driving member 60 and the driven member 61 actuates the roller 92 and overcoming the effort of the spring 69 forces the stopping means 65 against the disk 108 of the supporting member 62 and thus stops the latter. Since that moment starts a next cycle of transmitting motion and torque from the driving member 60 to the driven member 61 with a gear ratio preset through the medium of the regulating means 64.

Figure 5:
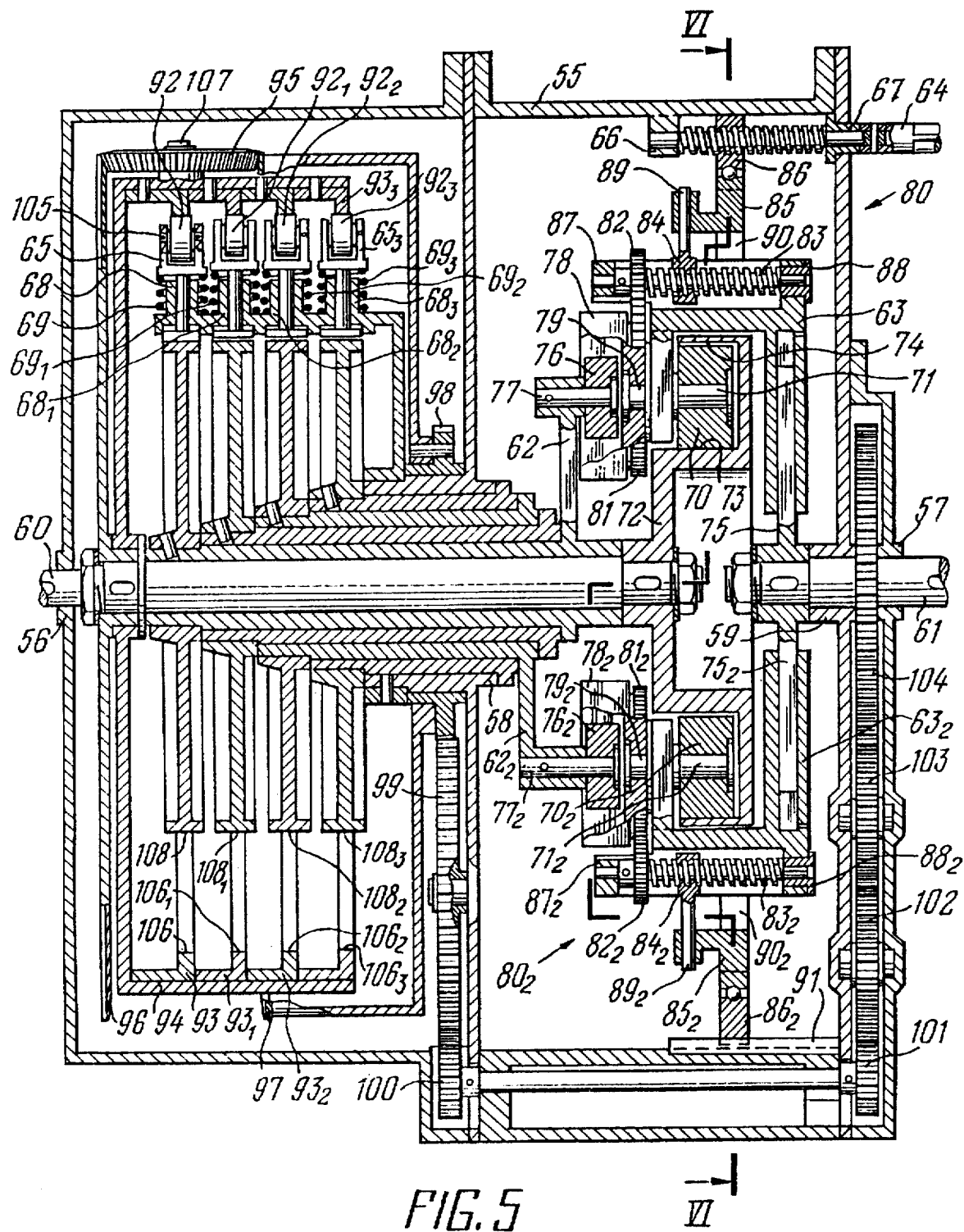
FIG. 5 is a diagrammatical view in longitudinal section of an alternative embodiment of a device for a continuous transmission of motion, according to the invention.
Figure 6:
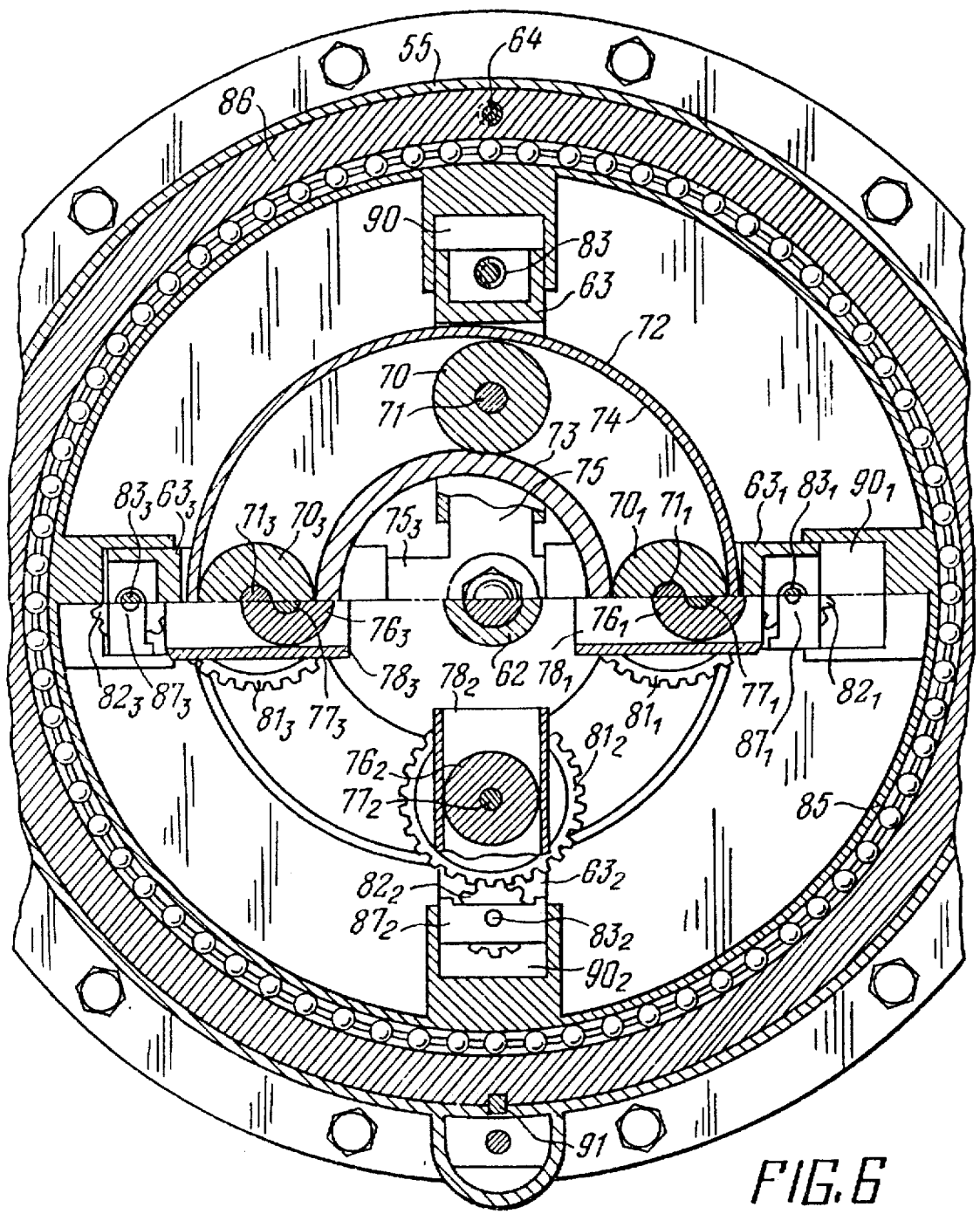
FIG. 6 is a section taken on VI—VI of FIG. 5.

An alternative embodiment of a device for a continuous transmission of motion shown in FIGS. 5 and 6, according to the invention, comprises all the members and links existing therebetween of a device for a periodic transmission of motion, and additionally incorporates three intermediate members $63_1$, $63_2$ and $63_3$, each of which is interchangeable with the intermediate member 63 and respectively three supporting members $62_1$, $62_2$ and $62_3$, each of which is analogous to the supporting member 62 in functional application and design embodiment.

Each of the supporting members $62_1$, $62_2$ and $62_3$ is installed in the bearing 58 of the housing 55 for coaxial rotation with the supporting member 62, the driving member 60 and the driven member 61.

Each of the intermediate members $63_1$, $63_2$ and $63_3$ has an operative engagement with the driving member 60 and the driven member 61 analogous in its essence to the operative engagement of the intermediate member 63 with the same members (the driving member 60 and the driven member 61). The intermediate members 63, $63_1$, $63_2$ and $63_3$ are uniformly spaced circumferentially relative to the axis of rotation of the driving member 60, the driven member 61 and the supporting members 62, $62_1$, $62_2$ and $62_3$ which is insured by the construction of the driven member 61 which is essentially a carrier of each of the intermediate members and installed on which are four guides 75, $75_1$, $75_2$ and $75_3$ uniformly spaced circumferentially relative to the axis of rotation of the driven member 61.

The operative engagement of each of the intermediate members $63_1$, $63_2$ and $63_3$ with respective members from the supporting members $62_1$, $62_2$ and $62_3$ is analogous in its essence to the operative engagement of the intermediate member 63 with the supporting member 62. The difference resides in that the first ring-shaped member 85 forms the rectilinear kinematic pair with each of the nuts $84_1$, $84_2$ and $84_3$ analogous to the kinematic pair formed by the first ring-shaped member 85 with the nut 84 including a respective rod from the rods $89_1$, $89_2$ and $89_3$ connected with the nut and the rod guide in the first ring-shaped member 85.

Each of the supporting members $62_1$, $62_2$ and $62_3$ similar to the supporting member 62 is provided with a disk installed thereon coaxially therewith, and respectively from the disks $108_1$, $108_2$ and $108_3$. At a period of stopping a respective member from the supporting members $62_1$, $62_2$ and $62_3$ each of the disks $65_1$, $65_2$ and $65_3$ gets in cooperation with a respective means from the stopping means $65_1$, $65_2$ and $65_3$ each being installed in the housing 55 similar to the stopping means 65 and cooperates with a respective cam from the cams $93_1$, $93_2$ and $93_3$ each being installed similar to the cam 93 on the carrier 94 of the bevel gear 95.

The closed wavy surfaces 73 and 74 of the face grooved cam 72, working surfaces 106, $106_1$, $106_2$ and $106_3$ of each of the respective cams 93, $93_1$, $93_2$ and $93_3$ and their arrangement meet the requirements laid down hereinbefore in the description of a device for a periodic transmission of motion. In this case the value of parameter μ in a device for a continuous transmission of motion comprising four intermediate members 63, $63_1$, $63_2$ and $63_3$ has the value greater than 0.5, for example, 0.6.

A device for a continuous transmission of motion operates in the following manner. Let us assume that the regulating means 64 is set (turned) in the starting position in which the longitudinal axis of symmetry of the slot of each of the links 78, $78_1$, $78_2$ and $78_3$ is perpendicular to the axis of rotation of the driving member 60 and the driven member 61, i.e. the angle formed by the longitudinal axis of symmetry of the slot of each link with a circumferential direction relatively to said axis of rotation is equal to the right angle. This position of the members is illustrated in FIG. 5 and FIG. 6. When a torque is applied to the driving member 60 it starts to rotate. As the device comprises four intermediate members 63, $63_1$, $63_2$ and $63_3$, four supporting members 62, $62_1$, $62_2$ and $62_3$, four stopping means 65, $65_1$, and $65_2$ and $65_3$ and four cams 93, $93_1$, $93_2$ and $93_3$ with a previously described profile of the working surface and arrangement of each of said cams, and with the value of parameter $\mu$ equal to 0.6, then at any instant one of the disks 108, $108_1$, $108_2$ and $108_3$ and, consequently, one of said supporting members are stopped. As the longitudinal axis of symmetry of the slot of each of the links 78, $78_1$, $78_2$ and $78_3$ and, consequently, of the slot of the link cooperating with the stopped supporting member, in this case, with the supporting member 62, is perpendicular to the axis of rotation of the driving member 60 and the driven member 61, then under the action of the rotating cam 72 the intermediate member 63 translates in the direction perpendicular to the axis of rotation of said members. Therefore the driven member 61 forming in conjunction with the intermediate member 63 a rectilinear kinematic pair, remains motionless. The intermediate members $63_1$, $63_2$ and $63_3$ in conjunction with the driven member 61 remain motionless circumferentially relative to the axis of rotation of the driven member 61 despite the fact that the supporting members $61_1$, $62_2$ and $63_3$ are not stopped. This is conditioned by that the intermediate members $63_1$, $63_2$ and $63_3$ are connected with the intermediate member 63 through the medium of the driven member 61. With the links 78, $78_1$, $78_2$ and $78_3$ in said position all the intermediate members 63, $63_1$, $63_2$ and $63_3$ perform a translational motion in the direction perpendicular to the axis of rotation of the driving member 60 and the driven member 61 under the action of the rotating cam 72 of the driving member 60.

As the intermediate members 63, $63_1$, $63_2$ and $63_3$ are uniformly spaced circumferentially relative to the axis of rotation of the driving member 60 and their rollers respectively 70, $70_1$, $70_2$ and $70_3$ are in different positions on the wavy surface of the cam 72, then the phases of the translational motion of said intermediate members are different. For example, if the members are in positions shown in FIG. 5 and FIG. 6, then with the driving member 60 uniformly rotating clockwise the intermediate member 63 translates at a speed proportional to its distance from the axis of rotation of the driving member 60 in the direction away from said axis, the intermediate members $63_1$ and $63_3$ remain motionless and the intermediate member $63_2$ moves at a translational speed proportional to its distance from the axis of rotation of the driving member 60 in the direction towards said axis. In this position the intermediate member $63_1$ has an acceleration the vector of which is radially directed to the axis of rotation of the driving member 60, and the intermediate member $63_3$ has an acceleration the vector of which is radially directed away from the axis of rotation of the driving member 60.

When the driving member 60 continues to rotate and the period of stopping the supporting member 62 comes to completion, there takes place an alternative stopping of the supporting members $62_1$, $62_2$, $62_3$, 62 . . . and so forth, insured by kinematic connections of the stopping means $65_1$, $65_2$, $65_3$, 65 with the driving member 60 and the driven member 61, and there also takes place a change in the phases of the translational motion of each of the intermediate members 63, $63_1$, $63_2$ and $63_3$ in synchronism with the periods of stopping the supporting members insured by kinematic connections of each of the intermediate members with the driving member 60, the driven mmember 61 and with one of the supporting members characterized hereinbefore. As was already mentioned the phases of motion of the intermediate members at any moment of time are different. Periods of motion of each of the intermediate members are similar to periods of motion of the intermediate member given hereinbefore in the description of operation of a device for a periodic transmission of motion.

With the regulating means 64 in said position and with the links 78, $78_1$, $78_2$ and $78_3$ in the relevant positions the rotation of the driving member 60 provides a reciprocating motion of the intermediate members 63, $63_1$, $63_2$ and $63_3$, rotation of gears 96 and 95 with the carrier 94 and the cams 93, $93_1$, $93_2$ and $93_3$, rotation of the rollers 92, $92_1$, $92_2$ and $92_3$ and a periodic translational motion of the stopping means 65, $65_1$, $65_2$ and $65_3$ with the springs 69, $69_1$, $69_2$ and $69_3$. All other members of the device including the driven member 61 remain motionless and the value of the gear ratio is equal to infinity, i.e. the motion and the torque are not transmitted from the driving member 60 to the driven member 61. Moreover, the driven member 61 is stopped despite the fact that the driving member is rotating.

For transmitting motion (and torque) from the driving member 60 to the driven member 61 in this is situation, it sufficient to change the angular position of the regulating means 64 in supports 66 and 67 of the housing 55. In this case the second ring-shaped member 86 together with the first ring-shaped member 85 will move in the direction parallel to the axis of rotation of the driving member 60 and the driven member 61, and will move the spherical nuts 84, $84_1$, $84_2$ and $84_3$ in the same direction. In this case, each of the lead screws 83, $83_1$, $83_2$ and $83_3$ in conjunction with the respective gears 82, $82_1$, $82_2$ and $82_3$ will turn through a definite angle relatively to the intermediate members 63, $63_1$, $63_2$ and $63_3$ in the bearings. 87, $87_1$, $87_2$, $87_3$ and 88, $88_1$, $88_2$ and $88_3$ will turn through a definite angle the gears 81, $81_1$, $81_2$ and $81_3$ in conjunction with the links 78, $78_1$, $78_2$ and $78_3$ relatively to the intermediate members 63, $63_1$, $63_2$ and $63_3$ on the journals 79, $79_1$, $79_2$ and $79_3$.

When the regulating means 64 is turned in one direction from the starting position the angle formed by the longitudinal axis of symmetry of the slot of each of the links 78, $78_1$, $78_2$ and $78_3$ and the vector of linear speed of the driving member 60 will be acute and its magnitude will decrease as the regulating means 64 is being turned in the same direction, and when the regulating means 64 is turned from the starting position in the opposite direction said angle will be obtuse and its magnitude will increase when the regulating means 64 is being turned in the same direction.

In both cases the motion of one of the intermediate members 63, $63_1$, $63_2$ and $63_3$ whose supporting member from the supporting members 62, $62_1$, $62_2$ and $63_3$ is stopped at the moment under review has two components, a translational one which is perpendicular to the axis of rotation of the driving member 60 and a tangential one which is tangential relatively to said axis. And in the first case, i.e. when said angle is acute the direction of the tangential component of the intermediate member motion being tangential coincides with the direction of the driving member linear speed in the plane parallel to the vector of the tangential component of motion of the intermediate member and to the axis of rotation of the driving member 60, and in the second case, i.e. when said angle is obtuse the direction of the tangential component of the intermediate member motion being tangential is opposite to the direction of the linear speed of the driving member 60 in the plane parallel to the vector of the tangential component of the intermediate member motion and to the axis of rotation of the driving member 106. In other words, the intermediate member performing the translational motion rotates, in the first case, in the same direction relatively to the axis of rotation of the driving member as does the driving member, and in the second case the intermediate member rotates in the direction opposite to the direction of rotation of the driving member.

The ratio of values of said components of the intermediate member motion, as described hereinbefore, defines the value of a gear ratio in a device based on the proposed method for transmitting motion and is presented by the device being now described.

The rotational (angular) component of motion of the intermediate member the supporting member of which is stopped is transmitted through the medium of the operative engagement including a respective guide from the guides 75, $75_1$, $75_2$ and $75_3$ of this intermediate member to the driven member 61, and by means of the operative engagement including said respective guides is transmitted to each of the intermediate members the supporting members of which are not stopped at the moment under review. In this case, the phases of motions of the intermediate members are different.

When the driving member 60 is uniformly rotating and the regulating means 64 is kept in the preset position, i.e. when the value of the gear ratio is constant the angular speed of motion of each of the intermediate members relatively to the axis of rotation of the driving and driven members has the constant value and the same direction, while the translational component of motion of each of the intermediate members changes its value and direction. For example, when the roller 70 of the intermediate member 63 moves along the section of the wavy surface of the cam 72 having the profile of its section with a constant angle of ascent (equidistant curve of logarithmic spiral) the value of the translational component of motion of the intermediate member is proportional to the distance of the axis of rotation thereof from the axis of rotation of the driving member 60 in the direction away from said axis. When the roller 70 moves along the section of the wavy surface having the profile of its section with a variable angle of ascent the value of the translational component of motion of the intermediate member is decreasing to zero and then increases up to the value possessed by the translational component at the end of the preceding period, but in the direction towards the axis of rotation of the driving member. When said roller moves along the section of the wavy surface having the profile of its section with a constant angle of ascent (in this case, it may be called the angle of descent) the value of the translational component is proportional to the distance of the intermediate member away from the axis of rotation of the driving member and is directed towards said axis. Lastly, when the roller moves along the wavy surface having the profile of its section with a variable angle of ascent the value of the translational component of motion of the intermediate member in the direction towards the axis of rotation of the driving member decreases to zero and then increases to the value possessed by the translational component at the end of the preceding period, but is is directed away from said axis.

It should be noted, that when the driving member 60 is uniformly rotating and the regulating means 64 is kept in the preset position, i.e. when the gear ratio is constant, then the angular speed of each intermediate member relatively to the axis of rotation of the driving member 60 and the driven member 61 is constant in value, but the linear speed of the intermediate member, as well as the translational speed of its motion in the period of stopping the supporting member is variable in value and proportional to the distance of the intermediate member away from said axis of rotation and therefore their ratio defining the value of gear ratio is constant in value during said period.

In case of a nonuniform motion of the driving member 60 or in case of changing the position of the regulating means 64, or in both cases the translational and tangential components of motion of the intermediate member in any period of its motion will be variable, however the instantaneous value of the ratio of the values of said components, in the period of stopping a respective supporting member, will correspond to the instantaneous position of the regulating means 64. Therefore, the setting of an angular position of the regulating means 64 is essentially the presetting of components of motion of each intermediate member in the period of stopping a respective supporting member from said intermediate members and, consequently, is the presetting of the gear ratio. As the periods of an alternate stopping of the supporting members with said number of the intermediate members in the device and with the value of parameter μ are overlapping, then the transmission of motion from the driving member 60 to the driven member 61 with a preset gear ratio will be continuous.

The transmission of torque from the driving member 60 to the driven member 61 in an alternative embodiment of a device for a continuous transmission of motion is accomplished through the medium of each of the intermediate members 63, $63_1$, $63_2$ and $63_3$ in full compliance with the manner in which it is acomplished in a device for a periodic transmission of motion, with the only difference that in a device for a continuous transmission of motion separate consecutive periods of transmitting the torque through the medium of each from the intermediate members coinciding with the consecutive periods of stopping the respective supporting members is essentially a continuous process. Conversion of the torque and its direction is governed by a value of the gear ratio, i.e. by the position of the regulating means 64.

Each of the supporting members 62, $62_1$, $62_2$ and $62_3$ in the periods of time between the periods of its stopping is moving in the same manner as is laid .down hereinbefore in the description of operation of a device for a periodic transmission of motion. In this case the phases of motion of the supporting member are in full correspondence with the phases of motion of the intermediate member cooperating with the supporting member due to which the phases of motion of the supporting members are different.

It should be noted that in an alternative embodiment of a device for a continuous transmission of motion, as distinct from a device for a periodic transmission of motion each of the supporting members in any mode of the device operation is stopped only after the speed of the supporting member becomes equal to zero due to its cooperation with a respective intermediate member.

In devices for a continuous transmission of motion based on the proposed method of transmitting motion the value of a gear ratio does not depend upon load, as the transmission of torque is accomplished through the medium of forces of normal pressure between the mating surfaces of the members moving relatively to one another.

The present invention may be used to the best advantage in the field of transport machine building.

I claim:

1. A device for performing a method for transmitting motion, comprising:

a housing, said housing having coaxially rotating
said supporting member having a stopping means capable of motion in a direction perpendicular to the direction of linear speed of said supporting member, at least one intermediate member in operative engagement with said driving, driven and supporting members, a cylindrical grooved cam connected with one of said members and a body of revolution forming with another one of said members a first rotational kinematic pair the axis of which is perpendicular to the axis of rotation of said driving member, a groove of said cylindrical grooved cam having peripheral surfaces each being essentially a face circular wavy surface in contact with said body of revolution, an axis of said cylindrical grooved cam is coaxial with the axis of rotation of said driving member, wherein operative engagement of said intermediate member with said driven member formed by said members being essentially a translational kinematic pair, the direction of a relative motion of said members thereof is parallel to the axis of rotation of said driven member, a means for regulating the ratio of a rotational speed of said driving member to the rotational speed of said driven member, said means for regulating together with said housing form a second rotational kinematic pair, said intermediate member having a link and a fork through which said link is installed in said supporting member for rotation relatively to two mutually supporting members for rotation relatively to two mutually perpendicular axes, one of said axes is perpendicular to the axis of rotation of said supporting member and coincident with the axis of rotation of said fork in said supporting member, other of said axes coincident with the longitudinal axis of symmetry of a slot made in said link, a slide block of said link presenting a body of revolution, said body of revolution forms together with said intermediate member a third rotational kinematic pair the axis of which is perpendicular to the axis of rotation of said supporting member, a means for rotating said fork, said fork rotating means being in operative engagement with said regulating means and said supporting member, said stopping means of said supporting member is in inoperative engagement with said driving and driven member.

2. The device as set forth in claim 1, wherein said at least one supporting member is at least two said supporting members, each of said supporting members is installed in said housing for rotation relatively to the axis of rotation of said driving member and driven members, and is provided with a stopping means installed in said housing for motion in the direction perpendicular to the direction of linear speed of said additionally provided supporting member, said stopping means being in operative engagement with said driving and driven members, said at least one intermediate member is at least two intermediate members, the number of which corresponds to the number of the additionally provided supporting members and each of said additionally provided intermediate members is in operative engagement with said driving and driven members, and with a respective one from said supporting members analogous to the operative engagement of said first intermediate member with said driving, driven and supporting members, said intermediate members are uniformly spaced circumferentially relative to the axis of rotation of said driving member and said driven member, and the number of waves on said face circular wavy surface of said groove of said cam is equal to:

$$K = m \cdot n + 1$$

wherein:

K is the number of waves on the face circular wavy surface of the cam groove, m is the number of the intermediate members equal to the value of 2/μ rounded off to a nearest larger integer, μ denotes the ratio between the period of time within which the supporting member remains immovable and the half-period of time of motion performed by the intermediate member, and n is one of a natural number and zero.

3. A device as set forth in claim 1 or in claim 2, wherein the profile of each wave on the development of a section of said face circular wavy surface of said grooved cam made by the cylindrical surface concentric with the axis of rotation of said driving member is essentially an equidistant curve of the development of a trajectory at the point where said cylindrical surface intersects with the axis of the body of revolution contacting said wavy surface, and each wave on the development of said trajectory is symmetric about the surface formed by said cylindrical surface passing through the peak of the wave on the development of the trajectory, and each half-wave on the trajectory development has a rectilinear section and projections of finite points of said rectilinear section onto the wave height are at a height amounting respectively to about ½(1−μ) and about ½(1+μ) part of the wave height.

4. The device as set forth in claim 1 or claim 2, wherein said means for rotating said fork relatively to said supporting member comprises:

a connecting rod, said connecting rod and said fork forming a spherical joint the center of which is offset relatively to the axis of rotation of said fork in said supporting member, a first ring-shaped member forming with said connecting rod a second spherical joint and with said supporting member forms a rectilinear kinematic pair the direction of a relative motion of the members thereof is parallel to the axis of rotation of said supporting member, the second ring-shaped member forms together with said first ring-shaped member a fourth rotational kinematic pair the axis of rotation of which is coaxial with the axis of rotation of said supporting member and is perpendicular to the plane of said first ring-shaped member, said second ring-shaped member forms together with said housing a rectilinear kinematic pair the direction of a relative motion of the members thereof is parallel to the axis of rotation of said supporting member and is perpendicular to the plane of said second ring-shaped member and together with said regulating means forms a kinematic pair with a relative helical motion of the members and the axis of which is coaxial with the axis of rotation of said regulating means and is parallel to the axis of rotation of said supporting member.

5. A device for performing a method of transmitting motion comprising:

a housing, said housing having coaxially rotating driving, driven and supporting members installed therein, said supporting member having a stopping means capable of motion in the direction perpendicular to the direction of linear speed of said supporting member, at least one intermediate member in operative engagement with said driving, driven and supporting members, said intermediate member having a face grooved cam connected with one of said members and a body of revolution forming with another one of said members a rotational kinematic pair the axis of which is parallel to the axis of rotation of said driving member, a groove of said face grooved cam having working surfaces, said surfaces being essentially a closed wavy surface in contact with said body of revolution, the plane of said grooved cam is perpendicular to the axis of rotation of said driving member, a means for regulating the ratio of a rotational speed of said driving member to the rotational speed of said driven member, said regulating means together with said housing form a second rotational kinematic pair, wherein operative engagement of said intermediate member with said driven member formed by said members and being essentially a rectilinear kinematic pair, the direction of a relative motion of said members thereof is perpendicular to the axis of rotation of said driven member, said intermediate member having a link forming with said intermediate member a third rotational kinematic pair the axis of which is parallel to the axis of rotation of said supporting member and is perpendicular to the axis of symmetry of the slot made in said link, a slide block of said link presenting a body of revolution, said body of revolution forms together with said supporting member a fourth rotational kinematic pair the axis of which is parallel to the axis of rotation of said supporting member, a means for rotating said fork relatively to said intermediate member, said fork rotating means in operative engagement with said regulating means and said intermediate member, said stopping means of said supporting member is in operative engagement with said driving and driven members.

6. The device as set forth in claim 5, wherein said at least one supporting member is at least two said supporting members, and each of said supporting members is installed in said housing for rotation relatively to the axis of rotation of said driving member and said driven member, and is provided with stopping means installed in said housing for motion in the direction perpendicular to the direction of linear speed of said additionally provided supporting member, said stopping means being in operative engagement with said driving and driven members, said at least one intermediate member is at least two intermediate members the number of which corresponds to the number of the additionally provided supporting members and each of said additionally provided intermediate members is in operative engagement with said driving and driven members, and with a respective one from said supporting members analogous to the operative engagement of said first intermediate member with said driving, driven and supporting members, said intermediate members are uniformly spaced circumferentially relative to the axis of rotation of said driving and driven members, and the number of waves on said closed wavy surface of said grooved cam is equal to:

K=m·n+1 wherein:

K is the number of waves on the wavy surface of the grooved cam, m is the number of the intermediate members equal to the value of 2/μ rounded off to a nearest larger integer, μ denotes the ratio between the period of time within which the supporting member remains immovable and the half-period of time of motion performed by the intermediate member, and n is one of a natural number and zero.

7. A device as set forth in claim 5 or in claim 6, wherein the profile of a section of said closed wavy surface of said face grooved cam made by the plane perpendicular to the axis of rotation of said driving member is essentially an equidistant curve of the trajectory of the point at which said plane intersects with the axis of the body of revolution contacting said wavy surface being esentially a closed wavy curve each wave of which is symmetric about a straight line belonging to said plane and passing through the peak of a wave and the axis of rotation of said driving member, and each half-wave of said curve has a section being essentially an arc of a logarithmic spiral the finite points of which are located at a distance away from the axis of rotation of said driving member amounting, respectively, to about:

$$r_1 = r_{min} + \frac{1-\mu}{2} (r_{max} - r_{min});$$

$$r_2 = r_{min} + \frac{1+\mu}{2} (r_{max} - r_{min});$$

where:

$r_1$, $r_2$ are the distances from the axis of rotation of said driving member to the finite points of the arc of the logarithmic spiral;

$r_{max}$, $r_{min}$ are the maximum and minimum distances from the axis of rotation of said driving member to the trajectory of the point of the axis of the body of revolution.

8. A device as set forth in claim 5 or in claim 6, wherein said means for rotating said link relatively to said intermediate member comprises:

a first gear installed on said link coaxially with the axis of rotation thereof relatively to said intermediate member, a second gear meshed with said first gear, a lead screw connected coaxially with said second gear and forming together with said intermediate member a first rotational kinematic pair, the axis of this pair is parallel to the axis of rotation of said driving and driven members and coaxial with the axis of said lead screw, a nut forming together with said lead screw a screw kinematic pair the axis of which is coaxial with the axis of said lead screw, the first ring-shaped member forming together with said nut a first rectilinear kinematic pair the direction of a relative motion of the members thereof is perpendicular to the axis of rotation of said driving and driven members, a second ring-shaped member forming together with said first ring-shaped member a second rotational kinematic pair whose axis of rotation is coaxial with the axis of rotation of said driving and driven members and is perpendicular to the plane of said first ring-shaped member, said second ring-shaped member forming together with the housing of the device a second rectilinear kinematic pair the direction of a relative motion of the members thereof is parallel to the axis of rotation of said driving and driven members and is perpendicular to the plane of said second ring-shaped member, said second ring-shaped member forming together with said regulating means a kinematic pair with a helical relative motion of the members the axis of which is coaxial with the axis of rotation of said regulating means and is parallel to the axis of rotation of said driving and driven members.

9. A device as set forth in claim 2 or in claim 6, wherein said operative engagement of each from said stopping means with said driving and driven members comprises:

a roller forming together with said stopping means a first rotational kinematic pair whose axis of rotation is parallel to the axis of rotation of said supporting member, a cam contacting said roller and the axis of this cam is coaxial with the axis of rotation of said supporting member, a bevel gear, a carrier of said bevel gear connected with said cam and forming together with said driving member a second rotational kinematic pair coaxial with the axis of rotation of said driving member, said bevel gear forms together with said carrier a third rotational kinematic pair whose axis of rotation is perpendicular to the axis of rotation of said driving and driven members, said carrier is common for said cams of said stopping means, two other bevel gears are meshed with said bevel gear, and a first from two said bevel gears is connected with said driving member and is disposed coaxially therewith, and a second of two said other bevel gears forms together with said housing a fourth rotational kinematic pair the axis of which is coaxial with the axis of rotation of said driving member, a gearing with a gear ratio equal to minus one and connecting said second from said two other bevel gears with said driving member.

10. The device as set forth in claim 1 or in claim 5, wherein said operative engagement of said stopping means with said driving and driven members comprises:

a roller, said roller and said stopping means spring-loaded in said housing forming a first rotational kinematic pair whose axis of rotation is parallel to the axis of rotation of said supporting member, a cam contacting said roller, and the axis of rotation of this cam is coaxial with the axis of rotation of said supporting member.

a bevel gear, a carrier of said bevel gear connected with said cam and forming with said driving member a second rotational kinematic pair coaxial with the axis of rotation of said driving member, and said bevel gear forms together with said carrier a third rotational kinematic pair whose axis of rotation is perpendicular to the axis of rotation of said driving and driven members, two other bevel gears being in meshing with said bevel gear, a first of said two other bevel gears installed on said driving member coaxially therewith, a second of said two other bevel gears forms together with said housing a fourth rotational kinematic pair the axis of which is coaxial with the axis of rotation of said driving member, a gearing with a gear ratio equal to minus one and connecting said second from said two other bevel gears with said driving member.

11. A method for transmitting motion in a kinematic chain, comprising a driving member, a driven member, at least one intermediate member, and at least one supporting member, comprising the steps of:

imparting rotary motion to the driving member about its own axis;

stopping one of said supporting members;

converting said motion of said driving member into rotary motion relative to said axis of said driven member through one of said intermediate members which interacts with said driving member, said driven member, and said stopped supporting member, and imparting rotary motion to each of said other supporting members relative to said axis by means of one of said other intermediate members which interacts with said driving member, said driven member, and one of said other supporting members; mating surfaces of said driving member, said driven member, each of said intermediate members and each of said supporting members being so made that a difference between said motions of said driving and said driven members is converted into a translational component directed either parallel or perpendicular to said axis of each of the intermittent motions performed by each of said intermediate members with respect to said driving member, said driven member, and each of said supporting members; the direction of each of said intermittent relative motions performed by each of said intermediate members makes up an angle with the direction of said motion of said driving member in the plane either parallel or perpendicular respectively to said axis; said intermittent motions performed by said intermediate members relative to said driving member, said driven member, and each of said supporting members differ in phase;

changing each of said angles made up by the direction of at least one of said motions of each of said intermediate members relative to said driving member, said driven member, and each of said supporting members, with the direction of said motion of said driving member in the respective one of said planes;

wherein the directions of said motions of said intermediate member which interacts with said stopped supporting member relative to said driving member and said driven member intersect in the respective one of said planes when said supporting member is being stopped; and stopping each of said supporting members intermittently in accordance with the phase of one of said relative intermittent motions performed by the intermediate members which interacts with said supporting member;

wherein said supporting members and said intermediate members are equal in number.

12. The method as set forth in claim 11, further comprising:

keeping each of said supporting members immovable within a period of time from about $\frac{1}{4}(1-\mu)$ to about ¼(1+μ) each period of motion performed by said intermediate member interacting with said supporting member;

wherein said angles defined by the directions of motions performed by each of said intermediate members relative to said driving member and said driven member, with the direction of said motion performed by the driving member in the respective one of said planes are constant during a period of time from about ½(1−μ) to about ½(1+μ) each half-period of motion performed by said intermediate member;

changing said angles defined by the direction of motion performed by each of said intermediate members relative to one of said supporting members interacting with said intermediate member, and by the direction of said motion performed by said driving member in the respective one of said planes, wherein: μ denotes the ratio between the period of time within which the supporting member remains immovable and the half-period of time of motion performed by the intermediate member.

13. The method as set forth in claim 11 or 12, wherein the direction of motion of each of said intermediate members relative to said driven member is parallel to the direction of said translational component of motion performed by said intermediate member.

* * * * *